United States Patent
Bourlas et al.

(10) Patent No.: US 10,985,956 B2
(45) Date of Patent: *Apr. 20, 2021

(54) PRE-ALLOCATED RANDOM ACCESS IDENTIFIERS

(71) Applicant: Wi-LAN INC., Ottawa (CA)

(72) Inventors: Yair Bourlas, San Diego, CA (US); Adam E. Newham, Poway, CA (US); Lei Wang, San Diego, CA (US); Srikanth Gummadi, Sainikpuri (IN)

(73) Assignee: Wi-LAN, INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,252

(22) Filed: Oct. 3, 2018

(65) Prior Publication Data

US 2019/0044771 A1 Feb. 7, 2019

Related U.S. Application Data

(63) Continuation of application No. 15/193,988, filed on Jun. 27, 2016, now Pat. No. 10,805,131, which is a
(Continued)

(51) Int. Cl.
*H04L 27/26* (2006.01)
*H04W 74/08* (2009.01)
(Continued)

(52) U.S. Cl.
CPC ....... *H04L 27/2601* (2013.01); *H04B 7/2668* (2013.01); *H04J 11/0073* (2013.01);
(Continued)

(58) Field of Classification Search
CPC .. H04L 27/2601; H04L 5/0051; H04W 72/14; H04W 72/048; H04W 64/006;
(Continued)

(56) References Cited

U.S. PATENT DOCUMENTS 5,166,675 A 11/1992 Amemiya et al.
5,541,919 A 7/1996 Yong et al.
(Continued)

FOREIGN PATENT DOCUMENTS

CA 2309563 11/2000
CA 2393373 1/2004
(Continued)

OTHER PUBLICATIONS

*WI-LAN Inc. et al. V. LG Electronics, Inc. et al.*, Complaint for Infringement of U.S. Pat. No. 8,787,924, U.S. Pat. No. 8,867,351, U.S. Pat. No. 9,226,320, & U.S. Pat. No. 9,497,743, Case No. 3:18-cv-01577-AJB BGS (Jul. 11, 2018).
(Continued)

*Primary Examiner* — Andrew Lai
*Assistant Examiner* — Chuong M Nguyen
(74) *Attorney, Agent, or Firm* — Volpe Koenig

(57) ABSTRACT

Systems and methods of pre-allocating identifiers to wireless devices for use in requesting resources over a random access channel are described. A wireless communication system includes a random access channel over which wireless devices can anonymously send requests for resources. The base stations receiving and processing the anonymous requests reduces the probability of random access channel collisions and conserves the resources needed to support the anonymous requests by pre-allocating one or more identifiers to select wireless devices. The wireless devices having the pre-allocated codes can transmit a particular code over the random access channel as a request for resources that uniquely identifies the requester.

22 Claims, 6 Drawing Sheets

Related U.S. Application Data continuation of application No. 14/854,747, filed on Sep. 15, 2015, now Pat. No. 9,380,607, which is a continuation of application No. 14/831,525, filed on Aug. 20, 2015, now Pat. No. 9,226,320, which is a continuation of application No. 13/957,173, filed on Aug. 1, 2013, now Pat. No. 9,332,572, which is a continuation of application No. 13/565,405, filed on Aug. 2, 2012, now Pat. No. 8,532,052, which is a continuation of application No. 11/469,794, filed on Sep. 1, 2006, now Pat. No. 8,259,688.

(51) Int. Cl.

| | | |
|---|---|---|
| H04W 36/08 | (2009.01) | |
| H04W 74/00 | (2009.01) | |
| H04B 7/26 | (2006.01) | |
| H04W 76/28 | (2018.01) | |
| H04W 36/00 | (2009.01) | |
| H04J 11/00 | (2006.01) | |
| H04L 5/00 | (2006.01) | |
| H04W 64/00 | (2009.01) | |
| H04W 72/04 | (2009.01) | |
| H04W 72/14 | (2009.01) | |
| H04W 88/02 | (2009.01) | |
| H04W 88/08 | (2009.01) | |

(52) U.S. Cl.
CPC ....... *H04L 5/0051* (2013.01); *H04W 36/0016* (2013.01); *H04W 36/08* (2013.01); *H04W 64/006* (2013.01); *H04W 72/048* (2013.01); *H04W 72/14* (2013.01); *H04W 74/004* (2013.01); *H04W 74/006* (2013.01); *H04W 74/085* (2013.01); *H04W 74/0833* (2013.01); *H04W 74/0875* (2013.01); *H04W 74/0891* (2013.01); *H04W 76/28* (2018.02); *H04W 88/02* (2013.01); *H04W 88/08* (2013.01)

(58) Field of Classification Search
CPC ........... H04W 76/048; H04W 74/0833; H04W 36/0016; H04W 74/0891; H04W 74/004; H04W 74/006; H04W 36/08; H04W 74/085; H04W 74/0875; H04W 88/08; H04W 88/02; H04J 11/0073; H04B 7/2668

See application file for complete search history.

(56) References Cited

U.S. PATENT DOCUMENTS

| | | |
|---|---|---|
| 5,570,355 A | 10/1996 | Dail et al. |
| 5,640,395 A | 6/1997 | Hamalainen et al. |
| 5,703,873 A | 12/1997 | Ojanpera et al. |
| 5,724,168 A | 3/1998 | Oschmann et al. |
| 5,751,708 A | 5/1998 | Eng et al. |
| 5,784,695 A | 7/1998 | Upton et al. |
| 5,802,465 A | 9/1998 | Hamalainen et al. |
| 5,815,660 A | 9/1998 | Momona |
| 5,896,561 A | 4/1999 | Schrader et al. |
| 5,903,373 A | 5/1999 | Welch et al. |
| 5,970,062 A | 10/1999 | Bauchot |
| 6,041,051 A | 3/2000 | Doshi et al. |
| 6,067,301 A | 5/2000 | Aatresh |
| 6,072,784 A | 6/2000 | Agrawal et al. |
| 6,075,787 A | 6/2000 | Bobeck et al. |
| 6,101,175 A | 8/2000 | Schorman et al. |
| 6,115,390 A | 9/2000 | Chuah |
| 6,138,020 A | 10/2000 | Galyas et al. |
| 6,138,263 A | 10/2000 | Kodama |
| 6,141,336 A | 10/2000 | Bauchot et al. |
| 6,198,728 B1 | 3/2001 | Hulyalkar et al. |
| 6,216,006 B1 | 4/2001 | Scholefield et al. |
| 6,226,338 B1 | 5/2001 | Earnest |
| 6,295,285 B1 | 9/2001 | Whitehead |
| 6,327,254 B1 | 12/2001 | Chuah |
| 6,366,761 B1 | 4/2002 | Montpetit |
| 6,370,153 B1 | 4/2002 | Eng |
| 6,377,809 B1 | 4/2002 | Rezaiifar et al. |
| 6,381,228 B1 | 4/2002 | Prieto, Jr. et al. |
| 6,438,134 B1 | 8/2002 | Chow et al. |
| 6,438,386 B2 | 8/2002 | Joshi et al. |
| 6,452,940 B1 | 9/2002 | Yared et al. |
| 6,470,016 B1 | 10/2002 | Kalkunte et al. |
| 6,563,807 B1 | 5/2003 | Kim et al. |
| 6,567,416 B1 | 5/2003 | Chuah |
| 6,577,613 B1 | 6/2003 | Ramanathan |
| 6,603,738 B1 | 8/2003 | Kari et al. |
| 6,628,945 B1 | 9/2003 | Koorapaty et al. |
| 6,650,624 B1 | 11/2003 | Quigley et al. |
| 6,661,806 B1 | 12/2003 | Eriksson et al. |
| 6,714,562 B1 | 3/2004 | Calvignac et al. |
| 6,728,540 B1 | 4/2004 | DeSantis et al. |
| 6,754,196 B1 | 6/2004 | Daane et al. |
| 6,771,962 B2 | 8/2004 | Saifullah et al. |
| 6,778,521 B1 | 8/2004 | Korpela et al. |
| 6,778,835 B2 | 8/2004 | You et al. |
| 6,795,865 B1 | 9/2004 | Bahl et al. |
| 6,829,482 B2 | 12/2004 | Rune et al. |
| 6,850,504 B1 | 2/2005 | Cao et al. |
| 6,850,540 B1 | 2/2005 | Peisa et al. |
| 6,879,832 B1 | 4/2005 | Palm et al. |
| 6,958,989 B1 | 10/2005 | Dick et al. |
| 6,993,340 B1 | 1/2006 | Rinne et al. |
| 6,996,060 B1 | 2/2006 | Dahlby et al. |
| 7,006,428 B2 | 2/2006 | Proctor, Jr. et al. |
| 7,047,009 B2 | 5/2006 | Laroia et al. |
| 7,058,974 B1 | 6/2006 | Maher, III et al. |
| 7,151,758 B2 | 12/2006 | Kumaki et al. |
| 7,321,780 B2 | 1/2008 | Love et al. |
| 7,339,906 B1 | 3/2008 | Dahlby et al. |
| 7,356,339 B2 | 4/2008 | Nam |
| 7,408,901 B1 | 8/2008 | Narayanabhatla |
| 7,508,792 B2 | 3/2009 | Petrovic et al. |
| 7,570,618 B2 | 8/2009 | Son et al. |
| 7,574,210 B2 | 8/2009 | Kim et al. |
| 7,613,148 B2 | 11/2009 | Hong et al. |
| 7,636,570 B2 | 12/2009 | Cho et al. |
| 7,636,571 B2 | 12/2009 | Lee et al. |
| 7,693,093 B2 | 4/2010 | Riedel et al. |
| 7,693,517 B2 | 4/2010 | Etemad et al. |
| 7,724,706 B2 * | 5/2010 | Kang ............... H04L 47/788 370/331 |
| 7,783,311 B2 | 8/2010 | Takiishi et al. |
| 7,809,373 B2 | 10/2010 | Park et al. |
| 7,818,006 B2 | 10/2010 | Kim et al. |
| 7,945,263 B2 | 5/2011 | Noll et al. |
| 7,962,139 B2 | 6/2011 | Kangude et al. |
| 8,027,298 B2 | 9/2011 | Stanwood et al. |
| 8,064,401 B2 | 11/2011 | Anigstein et al. |
| 8,085,891 B2 | 12/2011 | Owen |
| 8,131,295 B2 | 3/2012 | Wang et al. |
| 8,229,437 B2 | 7/2012 | Bourlas et al. |
| 8,248,014 B2 | 8/2012 | Berman et al. |
| 8,312,142 B2 | 11/2012 | Rinne et al. |
| 8,331,933 B2 | 12/2012 | Koo et al. |
| 8,670,359 B2 | 3/2014 | Kim et al. |
| 8,867,351 B2 | 10/2014 | Gerkis |
| 9,247,515 B2 | 1/2016 | Flore et al. |
| 2001/0051992 A1 | 12/2001 | Yang et al. |
| 2002/0032788 A1 | 3/2002 | Emanuel et al. |
| 2002/0191562 A1 | 12/2002 | Kumaki et al. |
| 2003/0016648 A1 | 1/2003 | Lindsay et al. |
| 2003/0203736 A1 | 10/2003 | Chi et al. |
| 2004/0001491 A1 | 1/2004 | Ruutu et al. |
| 2004/0095892 A1 | 5/2004 | Sampath et al. |
| 2004/0100919 A1 | 5/2004 | Jang |
| 2004/0163084 A1 | 8/2004 | Devadas et al. |
| 2004/0176094 A1 | 9/2004 | Kim et al. |
| 2004/0196788 A1 | 10/2004 | Lodha |
| 2004/0219920 A1 | 11/2004 | Love et al. |

(56) References Cited

U.S. PATENT DOCUMENTS

| | | | |
|---|---|---|---|
| 2004/0228304 A1 | 11/2004 | Riedel | |
| 2005/0030931 A1* | 2/2005 | Sung | H04J 3/0682 |
| | | | 370/342 |
| 2005/0041573 A1* | 2/2005 | Eom | H04W 74/0866 |
| | | | 370/208 |
| 2005/0047368 A1 | 3/2005 | Kotzin et al. | |
| 2005/0053029 A1 | 3/2005 | Lee et al. | |
| 2005/0054357 A1 | 3/2005 | Takiishi et al. | |
| 2005/0054389 A1 | 3/2005 | Lee et al. | |
| 2005/0058058 A1* | 3/2005 | Cho | H04W 74/002 |
| | | | 370/208 |
| 2005/0063330 A1 | 3/2005 | Lee et al. | |
| 2005/0075108 A1 | 4/2005 | Cho et al. | |
| 2005/0086468 A1 | 4/2005 | Meandzija et al. | |
| 2005/0111409 A1 | 5/2005 | Spear et al. | |
| 2005/0117539 A1* | 6/2005 | Song | H04W 8/26 |
| | | | 370/328 |
| 2005/0124344 A1 | 6/2005 | Laroia et al. | |
| 2005/0124345 A1 | 6/2005 | Laroia et al. | |
| 2005/0192011 A1 | 9/2005 | Hong et al. | |
| 2005/0197132 A1 | 9/2005 | Lee et al. | |
| 2005/0207368 A1 | 9/2005 | Nam | |
| 2005/0208945 A1 | 9/2005 | Hong et al. | |
| 2005/0227691 A1 | 10/2005 | Pecen et al. | |
| 2005/0250499 A1 | 11/2005 | Lee et al. | |
| 2005/0266861 A1 | 12/2005 | Rajkotia | |
| 2005/0286465 A1 | 12/2005 | Zhuang | |
| 2005/0288023 A1 | 12/2005 | Kim et al. | |
| 2006/0002336 A1 | 1/2006 | Stanwood et al. | |
| 2006/0025134 A1 | 2/2006 | Cho et al. | |
| 2006/0025158 A1 | 2/2006 | Leblanc et al. | |
| 2006/0030309 A1 | 2/2006 | Lee et al. | |
| 2006/0035639 A1 | 2/2006 | Etemad et al. | |
| 2006/0083160 A1 | 4/2006 | Koo et al. | |
| 2006/0098749 A1 | 5/2006 | Sung et al. | |
| 2006/0194579 A1 | 8/2006 | Leung et al. | |
| 2006/0195576 A1 | 8/2006 | Rinne et al. | |
| 2007/0032255 A1* | 2/2007 | Koo | H04W 56/002 |
| | | | 455/512 |
| 2007/0037576 A1 | 2/2007 | Subramanian et al. | |
| 2007/0047486 A1 | 3/2007 | Lee et al. | |
| 2007/0047493 A1 | 3/2007 | Park et al. | |
| 2007/0066226 A1* | 3/2007 | Cleveland | H04B 7/10 |
| | | | 455/63.1 |
| 2007/0104177 A1 | 5/2007 | Hwang et al. | |
| 2007/0123257 A1 | 5/2007 | Noll et al. | |
| 2007/0149206 A1 | 6/2007 | Wang et al. | |
| 2007/0184865 A1 | 8/2007 | Phan et al. | |
| 2007/0191009 A1 | 8/2007 | Hong et al. | |
| 2007/0206531 A1 | 9/2007 | Pajukoski et al. | |
| 2007/0243873 A1 | 10/2007 | Jin et al. | |
| 2007/0254656 A1 | 11/2007 | Dalsgaard | |
| 2007/0258407 A1 | 11/2007 | Li et al. | |
| 2007/0268868 A1 | 11/2007 | Singh et al. | |
| 2007/0291696 A1 | 12/2007 | Zhang et al. | |
| 2008/0013489 A1 | 1/2008 | Anigstein et al. | |
| 2008/0019320 A1 | 1/2008 | Phan et al. | |
| 2008/0049678 A1 | 2/2008 | Chindapol et al. | |
| 2008/0102771 A1 | 5/2008 | Joshi et al. | |
| 2008/0268844 A1* | 10/2008 | Ma | H04W 36/0033 |
| | | | 455/436 |
| 2008/0273610 A1 | 11/2008 | Malladi et al. | |

FOREIGN PATENT DOCUMENTS

| | | |
|---|---|---|
| CA | 2516665 | 8/2005 |
| CA | 2597553 | 8/2007 |
| CA | 2651229 | 10/2008 |
| CA | 2734846 | 3/2010 |
| CA | 2655954 | 6/2013 |
| CA | 2659462 | 7/2013 |
| CN | 1596020 | 3/2005 |
| CN | 1794865 | 6/2006 |
| EP | 0 589 753 | 3/1994 |
| EP | 1 511 246 | 3/2005 |
| EP | 1 648 129 | 4/2006 |
| GB | 2324686 | 10/1998 |
| KR | 10-2006-0063135 | 7/2006 |
| WO | 98/27747 | 6/1998 |
| WO | 04/100403 | 11/2004 |
| WO | 2005/029785 | 3/2005 |
| WO | 2005/040960 | 5/2005 |
| WO | 2005/046090 | 5/2005 |
| WO | 2005/122622 | 12/2005 |
| WO | 2007/052916 | 5/2007 |
| WO | 2007/052922 | 5/2007 |
| WO | 2007/081183 | 7/2007 |
| WO | 2007/083230 | 7/2007 |

OTHER PUBLICATIONS

*WI-LAN Inc. et al. V. LG Electronics, Inc. et al.*, Defendants' Answer to Complaint, Affirmative Defenses, and Counterclaims, Case No. 3:18-cv-01577-AJB BGS (Oct. 10, 2018).

*WI-LAN Inc. et al. V. LG Electronics, Inc. et al.*, Plaintiffs' Answer to Defendants' Counterclaims, Case No. 3:18-cv-01577-AJB BGS (Oct. 31, 2018).

U.S. Appl. No. 60/732,080, filed Oct. 2005, Lee et al.

802.16.2, IEEE Recommended Practice for Local and metropolitan area networks, Coexistence of Fixed Broadband Wireless Access Systems, IEEE Computer Society and IEEE Microwave Theory and Techniques Society, IEEE Std 802.16.2-2004 (Revision of IEEE Sid 802.16.2-2001) (Mar. 17, 2004).

Affidavit of Chris Butler, Petitioner LG's Exhibit #1012 for *LG Electronics, Inc. et al. v. Wi-Lan Inc. et al.*, IPR2018-00705, U.S. Pat. No. 9,226,320 (Feb. 27, 2018).

Ala-Laurila, "The Magic WAND—Wireless ATM Network Demonstrator System," (1998).

Arraycomm, Inc., "Basic Elements of a TDD MBWA Air Interface," IEEE C802.20-03/14, IEEE 802.20 Working Group on Mobile Broadband Wireless Access (2003).

Baiocchi et al., "A MAC Protocol Supporting IP with QOS Guarantees in a Wireless Local Loop," Global Telecommunications Conference—Globecom '99 (1999).

Baker et al., "Management Information Base for the Differentiated Services Architecture" Request for Comments: 3289, Network Working Group (May 2002).

Bauchot et al., "MASCARA, a MAC Protocol for Wireless ATM," (Nov. 1996).

Bernet et al., "An Informal Management Model for diffserv Routers," Request for Comments: 3290, Network Working Group (May 2002).

Bourlas et al., "Figure 20L Correction and Clarification," IEEE 802.16 Broadband Wireless AccessWorking Group, IEEE C802.16e-05/282r2 (2005).

Choi et al., "A Dynamic Wavelength Allocation Scheme with Status Information for Fixed- and Variable-length Messages" 2358-2362 (1998).

Chu et al., "A QoS Architecture for the MAC Protocol of IEEE 802.16 BWA System," (2002).

Complaint, *WI-LAN USA, Inc. and WI-LAN, Inc. V. Alcatel-Lucent USA Inc.*, 1:12-cv-23568-CMA (Oct. 1, 2012) (USDC, SD FL.).

Complaint, *WI-LAN USA, Inc. and WI-LAN, Inc. V. Telefonaktiebolaget LM Ericsson, and Ericsson Inc.*, 1:12-cv-23569-DMM (Oct. 1, 2012) (USDC, SD FL.).

Crow et al., "IEEE 802.11 Wireless Local Area Networks," IEEE Communications Magazine (Sep. 1997).

CV of Dr. Robert AKL, Petitioner LG's Exhibit # 1004 for *LG Electronics, Inc. et al. v. Wi-Lan, Inc. et al.*, IPR2018-00704, U.S. Pat. No. 9,226,320 (Feb. 27, 2018).

CV of Gary R. Lomp, Ph.D., Wi-LAN Exhibit 2005-A for *LG Electronics, Inc. et al. V. WI-LAN Inc. et al.*, IPR2018-00704, U.S. Pat. No. 9,226,320 (Feb. 27, 2018).

Declaration of Andrew Parolin in Support of Patent Owner Preliminary Response, *LG Electronics, Inc. et al. V. WI-LAN Inc. et al.*, IPR2018-00704, U.S. Pat. No. 9,226,320, Wi-LAN Exhibit 2004 (Feb. 27, 2018).

(56) References Cited

OTHER PUBLICATIONS

Declaration of Craig Bishop, Petitioner LG's Exhibit # 1011 for *LG Electronics, Inc. et al.* v. *WI-LAN, Inc. et al.*, IPR2018-00704, U.S. Pat. No. 9,226,320 (Feb. 27, 2018).
Declaration of Douglas R. Wilson in Support of Patent Owner Preliminary Response, *LG Electronics, Inc. et al.* v. *WI-LAN, Inc. et al.*, IPR2018-00705, U.S. Pat. No. 9,226,320, Exhibit 2001 (Feb. 27, 2018).
Declaration of Douglas R. Wilson in Support of Patent Owner Preliminary Response, Wi-LAN Exhibit # 2001 for *LG Electronics, Inc. et al.* v. *Wi-Lan, Inc. et al.*, IPR2018-00705, U.S. Pat. No. 9,226,320 (Feb. 27, 2018).
Declaration of Dr. Gary Lomp in Support of Patent Owner Preliminary Response, *LG Electronics, Inc. et al.* V. *WI-LAN Inc. et al.*, IPR2018-00704, U.S. Pat. No. 9,226,320, Wi-LAN Exhibit 2005 (Feb. 27, 2018).
Declaration of Dr. Gary Lomp in Support of Patent Owner Preliminary Response, Wi-LAN Exhibit # 2002 for *LG Electronics, Inc. et al.* v. *Wi-Lan, Inc. et al.*, IPR2018-00705, U.S. Pat. No. 9,226,320 (Feb. 27, 2018).
Declaration of Dr. Robert AKL, Petitioner LG's Exhibit # 1003 for *LG Electronics, Inc. et al.* v. *Wi-Lan, Inc. et al.*, IPR2018-00704, U.S. Pat. No. 9,226,320 (Feb. 27, 2018).
Declaration of Dr. Robert AKL, Petitioner LG's Exhibit # 1003 for *LG Electronics, Inc. et al.* v. *Wi-Lan, Inc. et al.*, IPR2018-00705, U.S. Pat. No. 9,226,320 (Feb. 27, 2018).
Declaration of Ingrid Hsieh-Yee, Petitioner LG's Exhibit #1006 for *LG Electronics, Inc. et al.* v. *Wi-Lan Inc. et al.*, IPR2018-00705, U.S. Pat. No. 9,226,320 (Feb. 27, 2018).
Declaration of Ken Stanwood in Support of Patent Owner Preliminary Response, *LG Electronics Inc. et al.*, V. *WI-LAN Inc. et al.*, IPR2018-00704, U.S. Pat. No. 9,226,320, Wi-LAN Exhibit 2003 (Feb. 27, 2018).
Declaration of Shantanu Kangude, Petitioner LG's Exhibit # 1012 for *LG Electronics, Inc. et al.* v. *Wi-Lan, Inc. et al.*, IPR2018-00704, U.S. Pat. No. 9,226,320 (Feb. 27, 2018).
Declaration of Yair Bourlas in Support of Patent Owner Preliminary Response, *LG Electronics, Inc. et al.* V. *WI-LAN Inc. et al.*, IPR2018-00704, U.S. Pat. No. 9,226,320, Wi-LAN Exhibit 2002 (Feb. 27, 2018).
Devile, "A Reservation Based Multiple Access Scheme for a Future Universal Mobile telecommunications System," Roke Manor Research Limited (1993).
Dimou et al., "MAC Scheduling for Uplink Transmission in UMTS WCDMA" (2001).
Dyson et al., "A Dynamic Packet Reservation Multiple Access Scheme for Wireless ATM," (1997).
Ericsson, "Initial, Random Access and Identity Handling," TSG-RAN WG2 Meeting #51, R2-060592, Denver, US (Feb. 13-17, 2006).
Ericsson, "Non-Synchronized Random Access in E-UTRAN," 3GPP TSG-RAN WG2—Ad-Hoc on LTE, R2-061866, Cannes, France (Jun. 27-30, 2006).
Ericsson, "E-UTRA Random Access Preamble Design", TSG-RAN WG1 #44bis Athens, Greece, R1-060998 (Mar. 27-31, 2006).
Ericsson, "Random access with dedicated preambles at handover," 3GPP TSG-RAN WG2 #57bis, R2-071422 (Mar. 2007).
ETSI, "Cellular History," available at: http://www.etsi.org/technologies-clusters/technologies/past-work/cellular-history (Oct. 2017).
ETSI-GSM Technical Specification GSM 03.09 Version 3.2.1 (Feb. 1992).
ETSI-GSM Technical Specification GSM 05.01 Version 3.2.2 (Feb. 1992).
ETSI-GSM Technical Specification GSM 05.02 Version 3.8.0 (Dec. 1995).
ETSI-GSM Technical Specification GSM 05.10 Version 3.5.1 (Oct. 1992).
ETSI-GSM Technical Specification GSM 08.02 Version 3.3.1 (Feb. 1992).
ETSI-GSM Technical Specification GSM 08.08 Version 3.10.1 (Feb. 1992).
ETSI-GSM Technical Specification GSM 08.52 Version 3.0.2 (Feb. 1992).
ETSI-GSM Technical Specification, GSM 01.02, Version 5.0.0 (Mar. 1996).
ETSI-GSM Technical Specification, GSM 01.02, Version 6.0.1 (Nov. 1998).
European Patent Office, "Communication of a Notice of Opposition," European Patent Application No. 10189288.3, Opposition by Dr. Werner Rach (Sep. 26, 2017).
European Patent Office, "Communication of a Notice of Opposition," European Patent Application Application No. 10189288.3, Opposition by Hoffmann Eitle Patent and Rechtsanwaelte PartmbB (Oct. 16, 2017).
European Patent Office, "Communication of a Notice of Opposition," European Patent Application Application No. 10189288.3, Opposition by LG Electronics (Sep. 21, 2017).
European Telecommunications Standards Institute, "Digital cellular telecommunications system (Phase 2+); Physical layer on the radio path; General description (3GPP 45.001 version 5.9.0 Release 5)," ETSI TS 145 001 V5.9.0 (Apr. 2005).
European Telecommunications Standards Institute, Universal Mobile Telecommunications System (UMTS); Physical channels and mapping of transport channels onto physical channels (FDD) (3G TS 25.211 version 3.1.1 Release 1999), ETS ITS 125 211 V3.1.1 (Jan. 2000).
European Telecommunications Standards Institute, Universal Mobile Telecommunications System (UMTS); Spreading and modulation (FDD) (3G TS 25.213 version 3.1.1 Release 1999), ETS ITS 125 213 V3.1.1 (Jan. 2000).
European Telecommunications Standards Institute, Universal Mobile Telecommunications System (UMTS); Physical layer procedures (FDD) (3G TS 25.214 version 3.2.0 Release 1999), ETS ITS 125 214 V3.2.0 (Mar. 2000).
Fragouli et al. "Controlled Multimedia Wireless Lind Sharing via Enhanced Class-Based Queuing with Channel-State-Dependent Packet Scheduling," 1998 IEEE, 572-580 (1998).
Gi Roux et al., "Quality of Service in ATM Networks—State of the Art Traffic Management" (1999).
Global System for Mobile Communications, Digital cellular telecommunications system (Phase 2+); General Packet Radio Service (GPRS); Overall description of the GPRS radio interface; Stage 2 (GSM 03.64 version 6.0.0) (Apr. 1998).
Global System for Mobile Communications, Digital cellular telecommunications system (Phase 2+); General Packet Radio Service (GPRS); Service description; Stage 2 (GSM 03.60 version 6.0.0) (Mar. 1998).
Global System for Mobile Communications, Digital cellular telecommunications system (Phase 2+); Mobile radio interface layer 3 specification (GSM 04.08 version 6.0.0 Release 1997) (Apr. 1998).
Global System for Mobile Communications, "Digital cellular telecommunications system (Phase 2+); General Packet Radio Service (GPRS); Mobile Station (MS)—Base Station System (BSS) interface; Radio Link Control/ Medium Access Control (RLC/MAC) protocol (GSM 04.60 version 6.0.0)," Draft EN (04.60) V6.0.0 (Mar. 1998).
Global System for Mobile Communications, "Digital cellular telecommunications system; General Packet Radio Service (GPRS); Mobile Station—Serving GPRS Support Node (MS-SGSN) Logical Link Control (LLC) Layer Specification (GSM 04.64 version 6.0.0)," TS 04.64 V6.0.0 (Mar. 1998).
Global System for Mobile Communications, "Digital cellular telecommunications system (Phase 2+); Radio subsystem synchronization (GSM 05.10 version 6.1.0)," GSM 05.10 V6.1.0 (Jan. 1998).
Global System for Mobile Communications, "Digital cellular telecommunications system (Phase 2+); Radio transmission and reception (GSM 05.05 version 6.1.0)," GSM 05.05 V6.1.0 (Apr. 1998).
Goldburg et al., "Basic Elements of a TDD MBWA Air Interface," IEEE 802 Executive Committee Study Group on Mobile Broadband Wireless Access (2003).
GSMA, "Brief History of GSM and the GSMA," available at: http://www.gsmworld.com/aboutus/history (Oct. 2017).

(56) References Cited

OTHER PUBLICATIONS

Heier et al., "Quality of Service scheduling for UMTS," Institution of Electrical Engineers (2003).
Hsiang-Jung Chiu, "Fast Base Station Switching for Realtime Services in IP-based OFDMA Systems with Fractional Frequency Reuse" (2005).
Huang et al., "Clarification of CDMA handover ranging process," IEEE 802.16 Broadband Wireless Access Working Group, IEEE C802.16e-04/472r1, (Nov. 2004).
Hung et al., "ATM via Satellite: A Framework and Implementation," (Apr. 15, 1996).
IEEE 802.16 Broadband Wireless Access Working Group, "Coordinated Association during scanning", IEEE C802.16e-05/143r8, IEEE, (May 4, 2005).
IEEE Computer Society and the IEEE Microwave Theory and Techniques Society, "Part 16: Air Interface for Fixed Mobile Broadband Wireless Access Systems, Amendment 2: Physical and Medium Access Control Layers for Combined Fixed and Mobile Operation in Licensed Bands and Corrigendum 1" IEEE Std 802.16e-2005 and IEEE Std 802.16-2004-Cor1-2005 (Amendment and Corrigendum to IEEE Std 802.16-2004) IEEE, (Feb. 28, 2006).
IEEE Computer Society and the IEEE Microwave Theory and Techniques Society, "Part 16: Air Interface for Fixed Broadband Wireless Access Systems", IEEE Std 802.16-2004, IEEE, (Oct. 1, 2004).
Information Sciences Institute, "Transmission Control Protocol—DARPA Internet Program Protocol Specification," RFC: 793 (Sep. 1981).
Information Sciences Institute, "DARPA Internet Program Protocol Specification," RFC 791 (Sep. 1981).
IPWireless, "Layer 1 signalling based user detection for L TE MBMS," Tdoc R2-062271 (2006).
Kang et al., "Method for usage of handover ranging code and handover ranging region in handover initial ranging," IEEE 802.16 Broadband Wireless Access Working Group, IEEE C802.16e-04/439r1, (Nov. 2004).
Kautz, "Scheduling and Resource Allocation in Broadband Multimedia Wireless Local Area Networks," (1998).
Kawagishi et al., "A Novel Reservation TDMA Based Multiple Access Scheme using Adaptive Modulation for Multimedia Wireless Communication Systems," (1998).
Khun-Jush et al., "Hiperlan type 2 for broadband wireless communication," Ericsson Review No. 2 (2000).
Kim et al., "A Seamless Handover Mechanism for IEEE 802.16e Broadband Wireless Access," International Conference on Computational Science, vol. 2, p. 5, Springer, Berlin, (2005).
Kim et al., "Seamless Mac Handover," IEEE 802.16 Broadband Wireless Access Working Group, IEEE C802.16e-04/456, (Nov. 2004).
Kim et al., "The Improvement of Scanning Method Using Preambles in IEEE 802.16e," IEEE 802.16 Broadband Wireless Access Working Group, IEEE C802.16e-04/209r2, (2004).
Kishore et al., "MAC Layer Scheduling Strategies during Handoff for Wireless Mobile Multimedia Networks," IEEE International Conference on Personal Wireless Communications, pp. 100-104 (Dec. 17-19, 1997).
Klerer, "Stds-802-mobility: Contributions for IEEE 802.20 Uploaded," Email to the IEEE MBWA ECSG mailing list, retrieved from: http://grouper.ieee.org/groups/802/mbwa/email/msg00088.html, available at: https://web.archive.org/web/20030528191748/http://grouper.ieee.org/groups/802/mbwa/email/msg00088.html (May 2003).
Konstantinos, "Quality of Service for IP-based Networks," (Mar. 2001).
Koo et al., "Comments on IEEE 802.16e Handoff Draft," IEEE 802.16 Broadband Wireless Access Working Group, IEEE C802.16e-03/21rl (Mar. 11, 2003).
Lamaire et al., Wireless LANs and Mobile Networking: Standards and Future Directions, IEEE Communications Magazine, 86-94 (Aug. 1996).
Lax et al., "WiMAX—Study of Mobility and a Mac-layer Implementation in GloMoSim," (2006).
Lee et al., "Changes on inter-base station messages associated with handover", IEEE 802.16 Broadband Wireless Access Working Group, IEEE C802.16e-04/20 (2004).
Lee et al., "Fast handover algorithm for IEEE 802.16e broadband wireless access system," 1st International Symposium on Wireless Pervasive Computing, 2006 (ISWPC '06), p. 1,6, Phuket, Thailand, (2006).
Lee, "A Set of Samsung Contributions on LTE," Email to the 3GPP TSG RAN WG1 Mailing list, available at: https://list.etsi.org/scripts/wa.exe?A2=ind0510A&L=3GPP_TSG_RAN_WG1&P=R581015 (Oct. 2005).
LG Electronics Inc., 3GPP TSG-RAN WG2 #52, "UE state transition in LTE_ACTIVE", R2-061002 Athens, Greece, (Mar. 27-31, 2006).
LG Electronics, "Uplink Resource Request for Uplink Scheduling," R1-060922, 3GPP TSG RAN WG1 #44bis (Mar. 27-31, 2006).
*LG Electronics, Inc. et al. V. WI-LAN Inc. et al.*, IPR2018-00704, U.S. Pat. No. 9,226,320, Decision Denying Institution of Inter Partes Review (Sep. 5, 2018).
*LG Electronics, Inc. et al. V. WI-LAN Inc. et al.*, IPR2018-00704, U.S. Pat. No. 9,226,320, Petition for Inter Partes Review (Feb. 27, 2018).
*LG Electronics, Inc. et al. V. WI-LAN Inc. et al.*, IPR2018-00705, U.S. Pat. No. 9,226,320, Decision Granting Institution of Inter Partes Review (Sep. 5, 2018).
*LG Electronics, Inc. et al. V. WI-LAN Inc. et al.*, IPR2018-00705, U.S. Pat. No. 9,226,320, Petition for Inter Partes Review (Feb. 27, 2018).
LG'S Opening Claim Construction Brief—Wi-LAN Exhibit 2007 for *LG Electronics, Inc. et al. V. WI-LAN Inc. et al.*, IPR2018-00704, U.S. Pat. No. 9,226,320 (Feb. 27, 2018).
Lim et al., "Enhancement to the BS-Inititated Handover," IEEE 802.16 Broadband Wireless Access Working Group, IEEE C802.16e-04/59, (May 2004).
Lin et al., "Asynchronous Multimedia Multihop Wireless Networks," IEEE 1997, 118-125 (1997).
Lin et al., "Real-time support in multihop wireless networks," Wireless Networks 5, 125-135 (1999).
Linnenbank et al., "A Request-TDMA Multiple-Access Scheme for Wireless Multimedia Networks," (Sep. 25, 1996).
Macario, "Modern Personal Radio Systems," IEE Telecommunications Series 33, (1996).
Malkowski et al., "Interaction between UMTS MAC Scheduling and TCP Flow Control Mechanisms," Proceedings of ICCT2003 (2003).
Mitrou et al., "A Reservation Multiple Access Protocol for Microcellular Mobile-Communication Systems," IEEE Transactions on Vehicular Technology, vol. 39, No. 4, 340-351 (Nov. 1990).
Mollenauer et al., "MAC Proposal for IEEE 802.16.1," IEEE 802.16.1mc--00/10 (2000).
Motorola, "E-UTRA Random Access Channel TP from Email Discussion," R1-060885, 3GPP TSG RAN #44-bis (Mar. 27-30, 2006)
Motorola, "System Broadcast," 3GPP TSG-RAN WG2 Meeting #53, R2-061459 (May 2006).
Mouly et al., "The GSM System for Mobile Communications," Telecom Publishing (Jun. 1992).
Network Working Group, "Internet Control Message Protocol—DARPA Internet Program Protocol Specification," RFC: 792 (Sep. 1981).
Nokia et al., "Intra-LTE Handover operation," 3GPP TSG-RAN WG2 Meeting #53, R2-061135 (May 8-13, 2006).
Nokia, "Non-contention based handover execution," 3GPP TSG-RAN WG2 Ad-hoc on LTE, R2-061848, Cannes, France (Jun. 27-30, 2006).
Nokia, "Functions of the Physical Layer," R2-060047, 3GPP TSG-RAN WG2 Meeting #50 (Jan. 2006).
Nokia, "Non contention based Ho," 3GPP TSG-RAN WG2 Meeting #56bis, R2-070011 (Jan. 2007).
Nokia, R2-060377, "RACH Message Structure," 3GPP TSG-RAN Working Group 2 Meeting #51 (Feb. 13, 2006).

(56) References Cited

OTHER PUBLICATIONS

NTT Docomo et al. "Random Access Transmission in E-UTRA Uplink", 3GPP TSG-RAN WG1 LTE Ad Hoc Meeting R1-060047 Helsinki, Finland, (Jan. 23-25, 2006).

Onggosanusi, "Texas Instruments contributions on LTE: batch ½," Email to the 3GPP TSG RAN WG1 mailing list, available at: https://list.etsi.org/scripts/wa.exe?A2=ind0510A&L=3GPP_TSG_RAN_WG1&P=R236845 (Oct. 2005).

Passas et al., "MAC Protocol and Traffic Scheduling for Wireless ATM Networks," (Sep. 1998).

Passas et al., "Quality-of-Service Oriented Medium Access Control for Wireless ATM Networks," IEEE, 42-50 (1997).

Passas et al., "Traffic Scheduling in Wireless ATM Networks," (May 1997).

Patent Application: Pre-Allocated Random Access Identifiers, Wi-LAN Exhibit 2002-A for *LG Electronics, Inc. et al. V. WI-LAN Inc. et al.*, IPR2018-00704, U.S. Pat. No. 9,226,320 (Feb. 27, 2018).

Patent Application: Pre-Allocated Random Access Identifiers, Wi-LAN Exhibit 2003-A for *LG Electronics, Inc. et al. V. WI-LAN Inc. et al.*, IPR2018-00704, U.S. Pat. No. 9,226,320 (Feb. 27, 2018).

Patent Owner Preliminary Response in *LG Electronics, Inc. et al. V. WI-LAN Inc. et al.*, IPR2018-00704, U.S. Pat. No. 9,226,320 (Feb. 27, 2018).

Patent Owner Preliminary Response in *LG Electronics, Inc. et al. v. Wi-Lan, Inc. et al.*, IPR2018-00705, U.S. Pat. No. 9,226,320 (Feb. 27, 2018).

Patent Owner Sur-Reply for *LG Electronics, Inc. et al. V. WI-LAN Inc. et al.*, IPR2018-00704, U.S. Pat. No. 9,226,320 (Feb. 27, 2018).

Petitioner's Reply to Patent Owner's Preliminary Response for *LG Electronics, Inc. et al. V. WI-LAN Inc. et al.*, IPR2018-00704, U.S. Pat. No. 9,226,320 (Feb. 27, 2018).

Pirskanen, Nokia Contributions to RAN2 #50, Email to 3GPP TSG RAN WG2 mailing list, available at: https://list.etsi.org/scripts/wa.exe?A2=ind0601&L=3GPP_TSG_RAN_WG2&P=R14373 (Jan. 2006).

Pisal, "Physical Layer Comparative Study of WiMAX and LTE," (2012).

Plaintiffs' Disclosure of Asserted Claims and Infringement Contentions Pursuant to L.R. 3.1 & 3.2, *Wi-Lan Inc. et al. v. LG Electronics Inc. et al.*, Case 3:17-cv-00358-BEN-MDD (S.D. Cal. Aug. 21, 2017); Petitioner LG's Exhibit #1009 for *LG Electronics, Inc. et al. v. Wi-Lan. et al.*, IPR2018-00705, U.S. Pat. No. 9,226,320 (Feb. 27, 2018).

Popovic et al., "Random Access Preambles for Evolved UTRA Cellular System," 2006 IEEE Ninth International Symposium on Spread Spectrum Techniques and Applications, Manaus-Amazon, pp. 488-492 (2006).

Print-out from Webpage Entitled: www.3gpp.org - /ftp/tsg_ran/WG1_Rl1/TSGR1_42bis/Docs/ (Sep. 2017).

Print-out from Webpage Entitled: www.3gpp.org - /ftp/tsg_ran/WG2_R12/TSGR2_50/Documents/, available at: http://www.3gpp.org/ftp/tsg_ran/wg2_rl2/TSGR2_50/Documents/ (Sep. 2017).

Print-out of Page Entitled: 3GPP Portal—Specification # 25.912, available at: http://portal.3gpp.org/desktopmodules/Specifications/SpecificationDetails.aspx?specificationId=1341 (Sep. 2017).

Print-out of Page Entitled: www.3gpp.org - /ftp/tsg_ran/wg2_rl2/TSGR2_54/Documents/, available at: http://www.3gpp.org/ftp/tsg_ran/wg2_rl2/TSGR2_54/Documents/ (Sep. 2017).

Print-out of Page Entitled: www.3gpp.org - /ftp/tsg_ran/wg2_rl2/TSGR2_AHs/2006_06_LTE/Docs/, available at: http://www.3gpp.org/ftp/tsg_ran/wG2_rl2/TSGR2_AHs/2006_06_LTE/Docs/ (Sep. 2017).

Print-out of Page Entitled: www.3gpp.org - /ftp/tsg_ran/wg2_rl2/TSGR2_52/Documents/, available at: http://www.3gpp.org/ftp/tsg_ran/wg2_rl2/TSGR2_52/Documents/ (Sep. 2017).

Print-out of the web page entitled "IEEE 802.20 Mobile Broadband Wireless Access (MBWA)—Subscribing to the MBWA ECSG e-mail reflector," retrieved from: http://grouper.ieee.org/groups/802/mbwa/eSubscribe.htm, available at: https://web.archive.org/web/20030117063120/http://grouper.ieee.org/groups/802/mbwa/eSubscribe.htm (Jan. 17, 2003).

Print-Out of Webpage Entitled: http://www.3gpp.org/ftp/tsg_ran/WG2_RL2/TSGR2_51/Documents/, Available at: https://web.archive.org/web/20070716061248/http://www.3gpp.org/ftp/tsg_ran/WG2_RL2/TSGR2_51/Documents/ (Jul. 16, 2007).

Print-Out of Webpage Entitled: http://www.3gpp.org/ftp/tsg_ran/WG1_RL1/TSGR1_AH/LTE_AH_0601/Docs/ (Retrieved on Sep. 11, 2018).

Print-out of Webpage Entitled: Index of /groups/802/20/Contribs, available at: http://grouper.ieee.org/groups/802/20/Contribs/ (Sep. 2017).

Print-out of Webpage Entitled: Index of /groups/802/20/Contribs, available at: https://web.archive.org/web/20051111204200/http://grouper.ieee.org/groups/802/20/Contribs/ (Nov. 2005).

Qualcomm Europe, "Cell Switching in LTE Active State," 3GPP TSG-RAN WG2 meeting #53, R2-061196 (May 2006).

Rexford et al., "A Scalable Architecture for Fair Leaky-Bucket Shaping," IEEE INFOCOM, (Apr. 1997).

Richardson, "WCDMA Design Handbook," Cambridge University Press, 1st edition (2005).

Ryu et al., "Enhanced contention based association," IEEE 802.16 Broadband Wireless Access WOrking Group, IEEE C802.16e-05/172r1, (Mar. 2005).

Samsung, "Data and Control Multiplexing in DFT-S-OFDM," R1-051039, 3GPP TSG RAN WG1 Meeting #42bis (Oct. 2005).

Samsung, "UL Timing Sync Procedure," 3GPP TSG RAN2#52, R2-0601006 (Mar. 2006).

Shahar et al., "Coordinated association during scanning", IEEE 802.16 Broadband Wireless Access Working Group, IEEE C802.16e-05/143, (Mar. 2005).

Siemens AG, "Multiplexing in HSDPA"—3GPP TSG-RAN WG2 Meeting #26, R2-020138, Sophia Antipolis, France, (Jan. 7-11, 2002).

Siemens, "Mobility in LTE Active," 3GPP TAN RAN WG2 #52, Tdoc R2-060915 (2006).

Texas Instruments Inc., "Content of initial Unsynchronized RACH access and contention resolution," 3GPP TSG RAN WG2 #54, R2-062107 (Sep. 2006).

Texas Instruments, "RACH Preamble Design," R1-051058, 3GPP TSG RAN WG1 Meeting #42bis, Microsoft WORD Document (Oct. 2005).

Texas Instruments, "RACH Preamble Design," R1-051058, 3GPP TSG RAN WG1 Meeting #42bis, PowerPoint Presentation (Oct. 2005).

The ATM Forum Technical Committee, "Traffic Management Specification Version 4.1," AF-TM-0121.000, (Mar. 1999).

Third Generation Partnership Project, "Technical Specification Group GSM/EDGE Radio Access Network; Multiplexing and multiple access on the radio path (Release 5)," 3GPP TS 45.002 V5.10.0 (Jun. 2003).

Third Generation Partnership Project, "Technical Specification Group Terminals; User Equipment (UE) conformance specification; Part 1: Protocol conformance specification (Release 5)," 3GPP TS 34.123-1 T5.1.0 (Sep. 2002).

Third Generation Partnership Project, "Technical Specification Group GSM/EDGE Radio Access Network; Mobile Switching Centre—Base Station System (MSC-BSS) interface; Layer 3 specification (Release 5)," 3GPP TS 48.008 V5.9.0 (Jul. 2003).

Third Generation Partnership Project, "Technical Specification Group GSM/EDGE Radio Access Network; Physical layer on the radio path; General description (Release 5)," 3GPP TS 45.001 V5.9.0 (Apr. 2005).

Third Generation Partnership Project, "Technical Specification Group GSM/EDGE Radio Access Network; Radio Subsystem synchronization (Release 5)," 3GPP TS 45.010 V5.3.0 (Aug. 2003).

Third Generation Partnership Project, "Technical Specification Group Core Network; Handover procedures (Release 5)," 3GPP TS 23.009 V5.8.0 (Mar. 2004).

(56) References Cited

OTHER PUBLICATIONS

Third Generation Partnership Project, "Technical Specification Group Core Network (CN); Mobile radio interface layer 3 specification, Core network protocols—Stage 2 (Release 5)," 3GPP TS 23.108 V5.0.0 (Jun. 2002).
Third Generation Partnership Project, "Technical Specification Group GSM/EDGE Radio Access Network; Mobile radio interface layer 3 specification; Radio Resource Control (RRC) protocol (Release 5)," 3GPP TS 44.018 V5.11.0 (Jul. 2003).
Third Generation Partnership Project, "Technical Specification Group GSG EDGE Radio Access Network; Base Station System—Mobile-services Switching Centre (BSS-MSC) interface; Interface principles (Release 5)," 3GPP TS 48.002 V5.1.0 (Feb. 2002).
Third Generation Partnership Project, "Technical Specification Group GSM/EDGE Radio Access Network; Mobile Switching Centre—Base Station System (MSC-BSS) interface; Layer 3 specification (Release 5)," 3GPP TS 48.008 T5.9.0 (Jul. 2003).
Third Generation Partnership Project, "Technical Specification Group GSM EDGE Radio Access Network; Base Station Controller—Base Transceiver Station (BSC-BTS) interface; Interface principles (Release 5)," 3GPP TS 48.052 V5.0.1 (Dec. 2002).
Third Generation Partnership Project, "Technical Specification Group Radio Access Network; Physical layer aspects for evolved Universal Terrestrial Radio Access (UTRA) (Release 7)," 3GPP TR 25.814 V7.0.0 (Jun. 2006).
Third Generation Partnership Project, Technical Specification Group Radio Access Network; Feasibility Study for Evolved UTRA and UTRAN (Release 7), 3GPP TR 25.912 V0.2.0 (Jun. 2006).
Third Generation Partnership Project, Technical Specification Group Services and System Aspects; Vocabulary for 3GPP Specifications (Release 7), 3GPP TR 21.905 V7.2.0 (Jun. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP TR 25.813 V7.0.0 (Jun. 2006).
Thomas et al., "An 8-user UMTS channel unit processor for 3GPP base station applications," Proceedings of the IEEE 2003 Custom Integrated Circuits Conference, pp. 275-278 (2003).
Tian et al., "Comment on Secure Roaming of Key Association for Fast Handover (C80216e-04_407)," IEEE 802.16 Broadband Wireless Access Working Group, IEEE C802.16e-04/571r2, (Jan. 2005).
TSG-RAN WG2, "CRs (Release '99 and Rei-4/Rel-5 category A) to 25.321," Meeting #19, RP-030100, Birmingham, UK, (Mar. 11-14, 2003).
Universal Mobile Telecommunications System (UMTS), "Physical channels and mapping of transport channels onto physical channels (FDD)," (3GPP TS 25.211 version 4.6.0 Release 4), ETSI TS 125 211 V4.6.0 (Sep. 2002).
Universal Mobile Telecommunications System (UMTS), "Physical layer procedures (FDD)," (3GPP TS 25.214 version 4.6.0 Release 4), ETSI TS 125 214 V4.6.0 (Mar. 2003).
Universal Mobile Telecommunications System (UMTS), "Spreading and modulation (FDD)," (3GPP TS 25.213 version 4.4.0 Release 4), ETSI TS 125 213 V4.4.0 (Dec. 2003).
Wang et al., "Fix the problem of Scan/Association related MAC management messages in referring BSs," IEEE 802.16 Broadband Wireless Access Working Group, IEEE C802.16e-318 (2005).
Wi-LAN Exhibit 2008 for *LG Electronics, Inc. et al. V. WI-LAN Inc. et al.*, IPR2018-00704, U.S.
Wi-LAN Exhibit 2009 for *LG Electronics, Inc. et al. V. WI-LAN Inc. et al.*, IPR2018-00704, U.S.
Wi-LAN Exhibit 2010 for *LG Electronics, Inc. et al. V. WI-LAN Inc. et al.*, IPR2018-00704, U.S.
Wi-LAN Exhibit 2011 for *LG Electronics, Inc. et al. V. WI-LAN Inc. et al.*, IPR2018-00704, U.S. Pat. No. 9,226,320 (Feb. 27, 2018).
Wi-LAN Exhibit 2012 for *LG Electronics, Inc. et al. V. WI-LAN Inc. et al.*, IPR2018-00704, U.S. Pat. No. 9,226,320 (Feb. 27, 2018).
Wi-LAN Exhibit 2013 for *LG Electronics, Inc. et al. V. WI-LAN Inc. et al.*, IPR2018-00704, U.S. Pat. No. 9,226,320 (Feb. 27, 2018).
Wi-LAN Exhibit 2014 for *LG Electronics, Inc. et al. V. WI-LAN Inc. et al.*, IPR2018-00704, U.S. Pat. No. 9,226,320 (Feb. 27, 2018).
Wi-LAN Exhibit 2015 for *LG Electronics, Inc. et al. V. WI-LAN Inc. et al.*, IPR2018-00704, U.S. Pat. No. 9,226,320 (Feb. 27, 2018).
Wi-LAN Exhibit 2016 for *LG Electronics, Inc. et al. V. WI-LAN Inc. et al.*, IPR2018-00704, U.S. Pat. No. 9,226,320 (Feb. 27, 2018).
Wi-LAN Exhibit 2017 for *LG Electronics, Inc. et al. V. WI-LAN Inc. et al.*, IPR2018-00704, U.S. Pat. No. 9,226,320 (Feb. 27, 2018).
Wi-LAN Exhibit 2018 for *LG Electronics, Inc. et al. V. WI-LAN Inc. et al.*, IPR2018-00704, U.S. Pat. No. 9,226,320 (Feb. 27, 2018).
*WI-LAN Inc. et al. V. LG Electronics, Inc. et al.*, Complaint for Infringement of U.S. Pat. No. 8,787,924, U.S. Pat. No. 8,867,351, U.S. Pat. No. 9,226,320, & U.S. Pat. No. 9,497,743, Case 3:17-CV-00358-MMA-BGS (Feb. 22, 2017).
*WI-LAN Inc. et al. V. LG Electronics, Inc. et al.*, Defendants and Counterclaim—Plaintiffs LG Electronics, Inc., LG Electronics U.S. A., Inc., and LG Electronics Mobilecomm U.S.A., Inc.'s Pleminary Invalidity Contentions Pursuant to Patent Local Rule 3.3, Case: 3:17-CV-00358-BEN-BGS (Oct. 20, 2017).
*WI-LAN Inc. et al. V. LG Electronics, Inc. et al.*, Defendants and Counterclaim—Plaintiffs LG Electronics, Inc., LG Electronics U.S. A., Inc., and LG Electronics Mobilecomm U.S.A., Inc.'s Amended Invalidity Contentions Pursuant to Patent Local Rule 3.6(b), Case: 3:17-CV-00358-BEN-BGS (Jan. 16, 2018).
*WI-LAN Inc. et al. V. LG Electronics, Inc. et al.*, Defendants LG Electronics, Inc., LG Electronics U.S.A., Inc., and LG Electronics Mobilecomm U.S.A., Inc.'s Answer to Complaint, Affimative Defenses, and Counterclaims, Case: 3:17-CV-00358-BEN-BGS (May 22, 2017).
*WI-LAN Inc. et al. V. LG Electronics, Inc. et al.*, Exhibit D (Invalidity Chart for the '320 Patent) of Defendants and Counterclaim—Plaintiffs LG Electronics, Inc., LG Electronics U.S.A., Inc., and LG Electronics Mobilecomm U.S.A., Inc.'s Preliminary Invalidity Contentions Pursuant to Patent Local Rule 3.3, Case: 3:17-CV-00358-BEN-BGS (Oct. 20, 2017).
*WI-LAN Inc. et al. V. LG Electronics, Inc. et al.*, Exhibit D (Invalidity Chart for the '320 Patent) of Defendants and Counterclaim—Plaintiffs LG Electronics, Inc., LG Electronics U.S.A., Inc. and LG Electronics Mobilecomm U.S.A., Inc.'s Amended Invalidity Contentions Pursuant to Patent Local Rule 3.3, Case: 3:17-CV-00358-BEN-BGS (Jan. 16, 2018).
*WI-LAN Inc. et al. V. LG Electronics, Inc. et al.*, Plaintiffs' Answer to Defendants LG Electronics, Inc., LG Electronics U.S.A., Inc., and LG Electronics Mobilecomm U.S.A., Inc.'s Counterclaims, Case 3:17-CV-00358-BEN-MDD (Jun. 12, 2017).
*WI-LAN, Inc. et al. V. Lenovo (United States) Inc. et al.*, Defendant Lenovo's Answer and Defenses, Case No. 3:17-CV-00365-BEN-BGS (May 5, 2017).
*WI-LAN, Inc. et al. V. Lenovo (United States) Inc. et al.*, Defendant Motorola's Answer and Defenses, Case No. 3:17-CV-00365-BEN-BGS (May 5, 2017).
*WI-LAN, Inc. et al. V. Lenovo (United States) Inc. et al.*, First Amended Complaint for Infringement of U.S. Pat. No. 8,787,924, U.S. Pat. No. 8,867,351, U.S. Pat. No. 9,226,320, & U.S. Pat. No. 9,497,743, Case No. 3:17-CV-00365-BEN-MDD (May 26, 2017).
*WI-LAN, Inc. et al. V. Lenovo Group, Ltd. et al.*, Complaint for Infringement of U.S. Pat. No. 8,787,924, U.S. Pat. No. 8,867,351, U.S. Pat. No. 9,226,320, & U.S. Pat. No. 9,497,743, Case No. 3:17-CV-00365-AJB-NLS (Feb. 23, 2017).
*WI-LAN, Inc. v. LG Electronics, Inc. et al*, Amended Statement of Defence and Counterclaim, Canadian Federal Court, Court No. T-1349-17 (May 25, 2018).
*WI-LAN, Inc. v. LG Electronics, Inc.*, Defendant LG Electronics' Statement of Defense, English translation, Mannheim Regional Court, 7th Civil Division, Germany (Jan. 22, 2018).
WI-LAN, Inc.'s Response to Opposition, European Patent Application No. 10189288.3 (Jun. 20, 2018).
WI-LAN, Inc.'s Response to Opposition, European Patent Application No. 13161149.3 (Aug. 3, 2018).
Wi-Lan's P.R. 4.4(a) Opening Claim Construction Brief, *Wi-Lan Inc. et al. v. LG Electronics, Inc. et al.*, Case 3:17-cv-00358-BENMDD, (S.D. Cal. Aug. 21, 2017); Petitioner LG's Exhibit

(56) References Cited

OTHER PUBLICATIONS

1010 for *LG Electronics, Inc. et al.* v. *Wi-Lan Inc. et al.*, IPR2018-00705, U.S. Pat. No. 9,226,320 (Feb. 27, 2018).
WI-LAN'S P.R. 4.4(a) Opening Claim Construction Brief—Wi-LAN Exhibit 2006 for *LG Electronics, Inc. et al.* V. *Wi-LAN Inc. et al.*, IPR2018-00704, U.S. Pat. No. 9,226,320 (Feb. 27, 2018).
WIMAX Forum, "Mobile WiMAX—Part 1: A Technical Overview and Performance Evaluation," WiMAX Forum, Beaverton, OR, (2006).
Wong et al., "Integrated data and speech transmission using packet reservation multiple access," IEEE, 172-176 (1993).
Zhang et al., "A Predictive Handoff Approach for Mobile IP," International Conference on Wireless and Mobile Communications, p. 78 (Jul. 29-31, 2006).
Zhang et al., "Bandwidth Reservation for Multimedia Traffic Over Micro Cellular Network," IEEE, 761-765 (1997).
Zhang et al., "Initial Ranging Overhead Reduction," IEEE 802.16 Broadband Wireless Access Working Group, IEEE C802.16e-04/225r1, (Jul. 2004).
ZTE et al., "Random Access Procedures," TSG-RAN Working Group 2 Adhoc on LTE, R2-061881 (Jun. 2006).
ZTE, "Feasibility of handover reference," TSG-RAN Working Group 2 meeting #54, R2-062191, Tallinn, Estonia (Aug. 28-Sep. 1, 2006).
ZTE, "Intra-LTE Handover Procedure by Using Dedicated Signature," TSG-RAN Working Group 2 meeting #56bis, R2-070029 (Jan. 2007).
ZTE, "Intra-RAT Handover Access Procedure," TSG-RAN Working Group 2 meeting #52, R2-061229 (2006).
ZTE, "Non-Contention Based Handover Procedure on RACH Channel," TSG-RAN Working Group 2 meeting #55, R2-062809 (2006).
ZTE, "Uplink Timing Resource Allocation," R1-061018, 3GPP TSG RAN WG1 #44bis (Mar. 27-31, 2006).
Becvar et al., "Handovers in the Mobile WiMAX" (2006).
Carneiro, "QoS Abstraction Layer in 4G Access Networks," Departamento de Engenharia Electrotecnica e de Computadores (2005).
Choi et al., "Fast handover scheme for real-time downlink services in IEEE 802.16e BWA system," 2005 IEEE 61st Vehicular Technology Conference, Stockholm, pp. 2028-2032 vol. 3 (2005).
Global System for Mobile Communications, Digital cellular telecommunications system (Phase 2+); General Packet Radio Service (GPRS); Mobile Station (MS)—Base Station System (BSS) interface; Radio Link Control/ Medium Access Control (RLC/MAC) protocol, (GSM 04.60 version 6.2.0 Release 1997), GSM 04.60 V6.2.0 (Oct. 1998).
*WI-LAN Inc. et al.* V. *LG Electronics, Inc. et al.*, Defendants and Counterclaim—Plaintiffs LG Electronics, Inc., LG Electronics U.S.A., Inc., and LG Electronics Mobilecomm U.S.A., Inc.'s Initial Invalidity Contentions Pursuant to Patent Local Rule 3.3, Case No. 3:18-cv-1577-H-AGS (Jan. 25, 2019).
*WI-LAN Inc. et al.* V. *Motorola Mobility LLC et al.*, Complaint for Patent Infringement, Civil Action No. 1:19-cv-941 (Feb. 14, 2019).
*WI-LAN Inc. et al.* V. *LG Electronics, Inc. et al.*, Defendants and Counterclaim—Plaintiffs LG Electronics, Inc., LG Electronics U.S.A., Inc., and LG Electronics Mobilecomm U.S.A., Inc.'s Amended Invalidity Contentions Pursuant to Patent Local Rule 16, Case No. 3:18-cv-1577-H-AGS (Apr. 5, 2019).
*WI-LAN Inc. et al.* V. *LG Electronics, Inc. et al.*, Exhibit D (Invalidity Chart for the '320 Patent) of Defendants and Counterclaim—Plaintiffs LG Electronics, Inc., LG Electronics U.S.A., Inc., and LG Electronics Mobilecomm U.S.A., Inc.'s Amended Invalidity Contentions Pursuant to Patent Local Rule 3.6, Case No. 3:18-cv-1577-H-AGS (Apr. 5, 2019).
European Patent Office, Submission in Response to the Summons Dated Nov. 9, 2018 Pursuant to Rule 115(1) EPC, and the Communication dated Nov. 19, 2018. Opposition against EP 2 312 900, Opposition by Hoffmann Eitle Patent and Rechtsanwaelte PartmbB (Mar. 20, 2019).
European Patent Office, Observations Responsive to the Summons of Nov. 9, 2018 and the Opposition Division's Preliminary Opinion Annexed Thereto. Opposition against EP 2 312 900, Opposition by Wuesthoff and Wuesthoff (Mar. 21, 2019).
WI-LAN'S P.R. 4.4(A) Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019).
WI-LAN'S P.R. 4.4(A) Opening Claim Construction Brief, *Wi-Lan Inc. et al.* v. *LG Electronics, Inc. et al.*, United States District Court, Southern District of California, Case No. 3:18-cv-01577-H-AGS, Declaration of Christopher First in Support of Wi-Lan's Opening Claim Construction Brief (Apr. 19, 2019).
WI-LAN'S P.R. 4.4(A) Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Plaintiff Wi-Lan Inc.'s Exhibit #16: *Wi-Lan Inc. et al.* v. *Alcatel-Lucent USA, Inc.*, Order on Claim Construction (Sep. 9, 2013).
WI-LAN'S P.R. 4.4(A) Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Plaintiff Wi-Lan Inc.'s Exhibit #31: Tanenbaum et al., "Computer Networks," Fifth Edition, pp. 407-411 (Oct. 7, 2010).
WI-LAN'S P.R. 4.4(A) Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Plaintiff Wi-Lan Inc.'s Exhibit #33: Preliminary Amendment filed Jul. 2, 2015 for U.S. Appl. No. 13/957,173, which issued as U.S. Pat. No. 9,332,572 on May 3, 2016.
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 11, 2005).
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019).
LG'S Opening Claim Construction Brief, *Wi-Lan Inc. et al.* v. *LG Electronics, Inc. et al.*, United States District Court, Southern District of California, Case No. 3:18-cv-01577-H-AGS, Declaration of James J. Lukas, Jr. in Support of Wi-Lan's Opening Claim Construction Brief (Apr. 19, 2019).
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Defendant LG's Exhibit 5: Decision to grant a European patent pursuant to Article 97(1) EPC dated Nov. 24, 2016 for the European Patent Application No. 10189288.3.
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Defendant LG's Exhibit 30: Patent Owner Response, in *LG Electronics, Inc. et al.* v. *Wi-Lan Inc. et al.*, IPR2018-00705, U.S. Pat. No. 9,226,320 (Dec. 4, 2018).
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Defendant LG's Exhibit 31: European Patent Application No. 10189288.3 PH, Response dated Jun. 28, 2016.
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Defendant LG's Exhibit 34: Declaration of Dr. Gary Lomp in Support of Patent Owner Response, in *LG Electronics, Inc. et al.* v. *Wi-Lan Inc. et al.*, IPR2018-00705, U.S. Pat. No. 9,226,320 (Dec. 4, 2018).
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19,

(56) References Cited

OTHER PUBLICATIONS

2019); Defendant LG's Exhibit 35: Videotaped Deposition of Gary Lomp, in *LG Electronics, Inc. et al.* v. *Wi-Lan Inc. et al.*, IPR2018-00705, U.S. Pat. No. 9,226,320 (Feb. 6, 2019).
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Defendant LG's Exhibit 36: Response to Non-Final Office Action Pursuant to 37 C.F.R. 1.111, filed Jul. 30, 2015 for U.S. Appl. No. 13/957,173, which issued as U.S. Pat. No. 9,332,572 on May 3, 2016.
LG'S Opening Claim Construction Brief, *Wi-Lan Inc. et al.* v. *LG Electronics, Inc. et al.*, United States District Court, Southern District of California, Case No. 3:18-cv-01577-H-AGS, (Apr. 19, 2019); Defendant LG's Exhibit 37: Reply Pursuant to 37 C.F.R. 1.111, filed Mar. 8, 2012 for U.S. Appl. No. 13/180,135, which issued as U.S. Pat. No. 8,229,437 on Jul. 24, 2012.
*LG Electronics, Inc. et al.* V. *WI-LAN Inc. et al.*, IPR2018-00705, U.S. Pat. No. 9,226,320, Oral Videotaped Deposition of Robert Akl, D.Sc. (Nov. 20, 2018).
*LG Electronics, Inc. et al.* V. *WI-LAN Inc. et al.*, IPR2018-00705, U.S. Pat. No. 9,226,320, Patent Owner Response (Dec. 4, 2018).
*LG Electronics, Inc. et al.* V. *WI-LAN Inc. et al.*, IPR2018-00705, U.S. Pat. No. 9,226,320, Declaration of Douglas R. Wilson in Support of Patent Owner Response (Dec. 4, 2018).
*LG Electronics, Inc. et al.* V. *WI-LAN Inc. et al.*, IPR2018-00705, U.S. Pat. No. 9,226,320, Petitioner's Reply (Feb. 25, 2019).
*LG Electronics, Inc. et al.* V. *WI-LAN Inc. et al.*, IPR2018-00705, U.S. Pat. No. 9,226,320, Second Declaration of Dr. Robert Akl, D.Sc.,Under 37 C.F.R. § 1.68 in Support of Petitioner's Reply in IPR2018-00705 (Feb. 25, 2019).
*LG Electronics, Inc. et al.* V. *WI-LAN Inc. et al.*, IPR2018-00705, U.S. Pat. No. 9,226,320, Patent Owner Surreply (Mar. 18, 2018).
*LG Electronics, Inc. et al.* V. *WI-LAN Inc. et al.*, IPR2018-00705, U.S. Pat. No. 9,226,320, Patent Owner's Exhibit 2008 (Mar. 8, 2013).
*LG Electronics, Inc. et al.* V. *WI-LAN Inc. et al.*, IPR2018-00705, U.S. Pat. No. 9,226,320, Patent Owner's Demonstrative Slides for May 6, 2019 Oral Argument (May 6, 2019).
*LG Electronics, Inc. et al.* V. *WI-LAN Inc. et al.*, IPR2018-00705, U.S. Pat. No. 9,226,320, Petitioner's Demonstratives for Oral Argument (Apr. 29, 2019).
*LG Electronics, Inc. et al.* V. *WI-LAN Inc. et al.*, IPR2018-00705, U.S. Pat. No. 9,226,320, LGE-1019—Oral Hearing Demonstrative (May 6, 2019).
*WI-LAN Inc. et al.* V. *LG Electronics, Inc. et al.*, Order: (1) Claim Construction Order; and (2) Denying Defendant's Motion for Partial Summary Judgment That Certain Claims Are Invalid As Indefinite, Case No. 3:18-cv-1577-H-AGS (May 28, 2019).
*WI-LAN Inc. et al.* V. *Huizhou TCL Mobile Communication Co. Ltd. et al.*, Complaint for Patent Infringement, Case No. 8:19-cv-00870 (May 9, 2019).
*WI-LAN Inc. et al.* V. *Motorola Mobility LLC et al.*, Defendants Motorola Mobility LLC and Motorola Mobility Holdings, LLC's Answer to Plaintiffs' Complaint, Civil Action No. 1:19-cv-00941 (Apr. 29, 2019).
European Patent Office, Submission in Reply to the Proprietor's Letter of Mar. 21, 2019 Transmitted with Communication dated Mar. 28, 2019. Opposition against EP 2 312 900, Opposition by Hoffmann Eitle Patent und Rechtsanwaelte PartmbB (May 13, 2019).
*WI-LAN Inc. .* v. *LG Electronics, Inc. et al*, Third Amended Fresh as Amended Statement of Claim, Canadian Federal Court, Court File No. T-1349-17 (May 22, 2019).
*WI-LAN Inc. et al.* V. *LG Electronics, Inc. et al.*, Declaration of James J. Lukas, Jr. In Support of LG's Responsive Claim Construction Brief, Case No. 3:18-cv-01577-H-AGS (May 3, 2019).
*WI-LAN Inc. et al.* V. *LG Electronics, Inc. et al.*, Case No. 3:18-cv-01577-H-AGS, Exhibit 40 to Declaration of James J. Lukas, Jr. In Support of LG's Responsive Claim Construction Brief, Merriam-Webster.com, Merriam-Webster, "Assign," "Allocate," "Grant" (May 3, 2019).
*WI-LAN Inc. et al.* V. *LG Electronics, Inc. et al.*, Case No. 3:18-cv-01577-H-AGS, Exhibit 41 to Declaration of James J. Lukas, Jr. In Support of LG's Responsive Claim Construction Brief, Wi-LAN's Oppositions to LG's Motions for Partial Summary Judgment, No. 3:17-cv-00358-BEN-MDD, Dkt. No. 95 (Mar. 5, 2018).
*WI-LAN Inc. et al.* V. *LG Electronics, Inc. et al.*, Case No. 3:18-cv-01577-H-AGS, Exhibit 42 to Declaration of James J. Lukas, Jr. In Support of LG's Responsive Claim Construction Brief, Declaration of Dr. Richard Gitlin in Support of Wi-LAN's Oppositions to LG's Motions for Partial Summary Judgment, No. 3:17-cv-00358-BEN-MDD, Dkt. No. 96-1, (Mar. 5, 2018).
*WI-LAN Inc. et al.* V. *LG Electronics, Inc. et al.*, LG's Responsive Claim Construction Brief, Case No. 3:18-cv-01577-H-AGS (May 3, 2019).
*WI-LAN Inc. et al.* V. *LG Electronics, Inc. et al.*, Exhibit A to LG's Responsive Claim Construction Brief, Wi-LAN's Constructions of "Traffic Shaping Rate", Case No. 3:18-cv-01577-H-AGS (May 3, 2019).
*WI-LAN Inc. et al.* V. *LG Electronics, Inc. et al.*, Exhibit B to LG's Responsive Claim Construction Brief, Exemplary Asserted Claim 1 of the '351 Patent With Wi-LAN's Construction for the TS Rate Terms Inserted, Case No. 3:18-cv-01577-H-AGS (May 3, 2019).
*WI-LAN Inc. et al.* V. *LG Electronics, Inc. et al.*, Wi-LAN's P.R. 4.4(b) Responsive Claim Construction Brief, Case No. 3:18-cv-01577-H-AGS (May 3, 2019).
*WI-LAN Inc. et al.* V. *LG Electronics, Inc. et al.*, Declaration of Christopher First in Support of Wi-LAN's Resp. Claim Construction Brief, Case No. 3:18-cv-01577-H-AGS (May 3, 2019).
*WI-LAN Inc. et al.* V. *LG Electronics, Inc. et al.*, Case No. 3:18-cv-01577-H-AGS, Exhibit 43 to Wi-LAN's Responsive Claim Construction Brief, Declaration of Dr. Robert Akl, D.Sc., Under 37 C.F.R. § 1.68 In Support of Petition for Inter Partes Review (Feb. 26, 2018).
*WI-LAN Inc. et al.* V. *LG Electronics, Inc. et al.*, Case No. 3:18-cv-01577-H-AGS, Exhibit 35 to Wi-LAN's Responsive Claim Construction Brief, *Wi-LAN USA, Inc., Wi-LAN, Inc.*, Plaintiffs—Appellants v. *Apple Inc.*, Defendant—Appellee, United States Court of Appeals, Federal Circuit, 830 F.3d 1374 (2016).
*WI-LAN Inc. et al.* V. *LG Electronics, Inc. et al.*, Case No. 3:18-cv-01577-H-AGS, Exhibit 36 to Wi-LAN's Responsive Claim Construction Brief, Declaration of Dr. Richard Gitlin in Support of Wi-LAN's Responsive Claim Construction Brief (May 3, 2019).
*WI-LAN Inc. et al.* V. *LG Electronics, Inc. et al.*, Case No. 3:18-cv-01577-H-AGS, Exhibit 38 to Wi-LAN's Responsive Claim Construction Brief, *WI-LAN USA, Inc. and WI-LAN, Inc.* V. *Alcatel-Lucent USA Inc.*, Order on Claim Construction, Case No. 12-23568-CIV-ALTONAGA/Simonton (USDC, SD FL.) (Sep. 9, 2013).
*WI-LAN Inc. et al.* V. *LG Electronics, Inc. et al.*, WiLAN's Second Amended Reply and Defence to Counterclaim, filed in the Canadian proceeding (T-1349-17) (Jul. 2, 2019).
Provision of the minutes in accordance with Rule 124(4) EPC dated Jun. 28, 2019 for the European Patent Application No. 10189288.3.
Decision revoking the European Patent (Art. 101(2) and 101(3)(b) EPC) dated Jun. 28, 2019 for the European Patent Application No. 10189288.3.
*WI-LAN Inc. et al.* V. *Huizhou TCL Mobile Communication Co. Ltd. et al.*, First Amended Complaint for Patent Infringement, filed against TCL (8:19-cv-00870 CDCAL) (Jul. 24, 2019).
*WI-LAN Inc. et al.* v. *LG Electronics, Inc. et al*, Third Amended Statement of Defence and Counterclaim, Canadian Federal Court, Court No. T-1349-17 (Jun. 21, 2019).
LG Electronics, "Uplink resource request for uplink scheduling," TSG-RAN WG1 Meeting #46, R1-062318, Tallinn, Estonia, (Aug. 28-Sep. 1, 2006).
Samsung, "LTE Transport Channels & Channel mapping", 3GPP TSG RAN2#48bis, R2-052408, Cannes, France, (Oct. 10-14, 2005).
Qualcomm Europe, "Access procedure for LTE", 3GPP TSG-RAN WG2 LTE, R2-060362, Denver, CO USA, (Feb. 13-17, 2006).

(56) References Cited

OTHER PUBLICATIONS

Texas Instruments, "Random Access usage for RRC state transitions and mobility support", 3GPP TSG RAN WG2 Meeting #52, R2-060852, Athens, Greece, (Mar. 27-31, 2006).
Qualcomm Europe, "Cell Switching in LTE_Active State", 3GPP TSG-RAN WG2, Meeting #52, R2-061036, Athens, Greece, (Mar. 27-31, 2006).
NTT Docomo, Inc., Nokia, Samsung, NEC, Panasonic, Motorola, "Text Proposal for TR 25.912, 13.6 Mobility", 3GPP TSG RAN WG2 #53, R2-061263, Shanghai, China, (May 8-12, 2006).
Texas Instruments Inc., "Reducing Handover Latencies in UL synchronization and initial UL allocation in LTE", Texas Instruments Inc, 3GPP TSG RAN WG2 Meeting # 54, R2-062109, Tallinn, Estonia, (Aug. 28-Sep. 1, 2006).
Ericsson, "Non-contention based and pre-synchronized access in LTE handover", 3GPP TSG-RAN WG2 #54, R2-062132,Tallinn, Estonia, (Aug. 28-Sep. 1, 2006).
LG Electronics (rapporteur),"Email discussion "Information of preamble for unsynchronized random access"", 3GPP TSG RAN WG2 Meeting #54, R2-062456, Tallinn, Estonia, (Aug. 28-Sep. 1, 2006).
Qualcomm Europe, "Design and Performance of BCH for E-UTRA", 3GPP TSG, RAN1 #46, R1-062038, Tallinn, Estonia, (Aug. 28-Sep. 1, 2006).
*WI-LAN Inc. et al.* v. *LG Electronics, Inc. et al*, Second Amended Reply to Defence to Counterclaim, Canadian Federal Court, Court No. T-1349-17 (Jul. 12, 2019).
*WI-LAN Inc. et al.* V. *LG Electronics, Inc. et al.*, Case No. 3:18-cv-01577-H-AGS, Exhibit 39 to Wi-LAN's Responsive Claim Construction Brief, Email Chain between James J. Lukas, Jr. and Eric Enger, (Apr. 9, 2019).
*WI-LAN Inc. et al.* V. *LG Electronics, Inc. et al.*, Case No. 3:18-cv-01577-H-AGS, Exhibit 41 to Wi-LAN's Responsive Claim Construction Brief, Elwalid et al., "Traffic Shaping at a Network Node: Theory, Optimum Design, Admission Control," Proceedings of INFOCOM '97, Kobe, Japan, pp. 444-454 vol. 2. (1997).
*WI-LAN Inc. et al.* V. *LG Electronics, Inc. et al.*, Case No. 3:18-cv-01577-H-AGS, Exhibit 42 to Wi-LAN's Responsive Claim Construction Brief, Patel et al., "End-Station Performance Under Leaky Bucket Traffic Shaping," in IEEE Network, vol. 10, No. 5, pp. 40-47, (Sep.-Oct. 1996).
*WI-LAN Inc. et al.* V. *Huizhou TCL Mobile Communication Co. Ltd. et al.*, Exhibit D to Complaint for Patent Infringement, Claim Chart for U.S. Pat. No. 8,259,688, Case No. 8:19-cv-00870 (May 9, 2019).
*LG Electronics, Inc. et al.* V. *WI-LAN Inc. et al.*, IPR2018-00705, U.S. Pat. No. 9,226,320, Record of Oral Hearing (May 6, 2019).
*LG Electronics, Inc. et al.* V. *WI-LAN Inc. et al.*, IPR2018-00705, U.S. Pat. No. 9,226,320, Final Written Decision, Inter Partes Review, 35 U.S.C. § 318(a) and 37 C.F.R. § 42.73 (Jul. 22, 2019).
*WI-LAN Inc. et al.* V. *Motorola Mobility LLC et al.*, Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-01 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-02 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-03 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-04 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-05 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-06 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-07 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-08 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-09 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-10 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-11 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-12 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-13 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-14 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-15 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-16 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-17 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-18 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-19 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-20 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-21 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-22 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al.* V. *Motorola Mobility LLC et al.*, Exhibit 320-23 to Motorola Mobility LLC and Motorola Mobility Holdings, LLC's

(56) References Cited

OTHER PUBLICATIONS

Initial Non-Infringement, Invalidity and Unenforceability Contentions, Civil Action No. 1:19-cv-00941 (Aug. 23, 2019).
*WI-LAN Inc. et al. V. Motorola Mobility LLC et al.*, Exhibit 320-24 to Motorola Mobility LLC and Motorola Mobility Holdings, LLC's Initial Non-Infringement, Invalidity and Unenforceability Contentions, Civil Action No. 1:19-cv-00941 (Aug. 23, 2019).
*WI-LAN Inc. et al. V. Motorola Mobility LLC et al.*, Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 1 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 2 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 3 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 4 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 5 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 6 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 7 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 8 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 9 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 10 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 11 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 12 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 13 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 14 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 15 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 16 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 17 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 18 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 19 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 20 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 21 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 22 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 23 to Plaintiffs' Initial Response to Non-Infringement and Invalidity Contentions Pursuant to LPR 2.5, Civil Action No. 1:19-cv-00941 (Sep. 20, 2019).
*WI-LAN Inc. et al. V. Motorola Mobility LLC et al.*, Exhibit 24 to Plaintiffs' Initial Response to Non-Infringement and Invalidity Contentions Pursuant to LPR 2.5, Civil Action No. 1:19-cv-00941 (Sep. 20, 2019).
Notice of Docketing and Notice of Appeal, *WI-LAN Inc.; WI-LAN Labs, Inc., and WI-LAN USA, Inc.*; Appellants, vs. *LG Electronics, Inc.; LG Electronics U.S.A., Inc.; and LG Electronics Mobilecomm U.S.A., Inc.*, Appellees. U.S. District Court of Appeals for the Federal Circuit, Case No. 19-2284 (Aug. 19, 2019) (Appeal from: Patent and Trademark Office—Patent Trial and APpeal Board in Inter Partes Review No. IPR2018-00705).
Notice of Non-Participation in Appeal, *WI-LAN Inc.; WI-LAN Labs, Inc., and WI-LAN USA, Inc.*; Appellants, vs. *LG Electronics, Inc.; LG Electronics U.S.A., Inc.; and LG Electronics MOBILECOMM U.S.A., Inc.*, Appellees. U.S. District Court of Appeals for the Federal Circuit, Case No. 19-2284 (Nov. 26, 2019) (Appeal from: Patent and Trademark Office—Patent Trial and Appeal Board in Inter Partes Review No. IPR2018-00705).
Notice of Appeal against Decision of the Opposition Division, European Patent No. 2 312 900 (10 189 288.3) (Aug. 16, 2019).
Withdrawal of the Opposition by the Respondent and Former Opponent, LG Electronics Deutschland GmbH, European Patent No. 2 312 900 (10 189 288.3) (Dec. 5, 2019).
WILAN Grounds of Appeal Submission, European Patent No. 2 312 900 (10 189 288.3) (Oct. 28, 2019).
Withdrawal of the Opposition by the Respondent and Former Opponent, LG Electronics Inc., European Patent No. 2 312 900 (10 189 288.3) (Dec. 5, 2019).
*WI-LAN Inc. et al. V. Huizhou TCL Mobile Communication Co. Ltd. et al.*, Plaintiffs' Answer to Defendants' Corrected Counterclaims (8:19-cv-00870 CDCAL) (Oct. 9, 2019).
*WI-LAN Inc. et al. V. Huizhou TCL Mobile Communication Co. Ltd. et al.*, Defendants' Answer, Affirmative Defenses and Counterclaims to First Amended Complaint for Patent Infringement (8:19-cv-00870 CDCAL) (Sep. 18, 2019).
*WI-LAN Inc. et al. V. Huizhou TCL Mobile Communication Co. Ltd. et al.*, Defendants' Answer, Affirmative Defenses and Corrected Counterclaims to First Amended Complaint for Patent Infringement (8:19-cv-00870 CDCAL) (Sep. 23, 2019).
Ex. INIC to Motorola Mobility LLC and Motorola Mobility Holdings, LLC's Initial Non-Infringement Contentions (Aug. 23, 2019).

(56) References Cited

OTHER PUBLICATIONS

European Patent Office, Communication of the Board of Appeals pursuant to Article 15(1) of the Rules of Procedure of the Boards of Appeal, Regarding EP 2 312 900, Preliminary Opinion, Appeal No. T2306/19-3.5.03 (Sep. 15, 2020).
European Patent Office, Submission by WiLAN, Inc. in Reply to the Board of Appeal's Preliminary Opinion, Regarding EP 2 312 900, Appeal No. T2306/19-3.5.03 (Oct. 27, 2020).
European Patent Office, Submission by WiLAN, Inc. Requesting Acceleration of the Appeal Proceedings, Regarding EP 2 312 900, Appeal No. T2306/19-3.5.03 (Aug. 4, 2020).
European Patent Office, Submission in Reply to the Proprietor's Request for Acceleration of Appeal Proceedings, Opposition against EP 2 312 900, Opposition by Hoffmann Eitle Patent and Rechtsanwaelte PartmbB, Appeal No. T2306/19-3.5.03 (Aug. 12, 2020).
European Patent Office, Summons to Oral Proceedings Pursuant to Rule 115(1) EPC, Appeal No. T2306/19-3.5.03 (Aug. 28, 2020).
Fischer et al., "MAC protocol for a CDMA based wireless ATM LAN," International Conference on Communications, pp. 1202-1206 vol. 3 (Jun. 1997).
*Huizhou TCL Mobile Communication Co. Ltd. et al.*, V. *WI-LAN Inc.*, Decision Denying Institution of Inter Partes Review, U.S. Pat. No. 8,259,688 B2, PTAB Case No. IPR2020-00302 (Aug. 3, 2020).
IEEE 802.16e-2005, IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1 (Feb. 28, 2006).
IEEE Std 802.16a-2003, IEEE Standard for Local and metropolitan area networks, Part 16: Air Interface for Fixed Broadband Wireless Access Systems—Amendment 2: Medium Access Control Modifications and Additional Physical Layer Specifications for 2-11 GHz (Apr. 1, 2003).
Ryu et al, "Enhanced contention based association," IEEE 802.16 Broadband Wireless Access Working Group, IEEE C802.16e-05/172 (Mar. 9, 2005).
Shahar et al., "Coordinated association during scanning," IEEE 802.16 Broadband Wireless Access Working Group, IEEE C802.16e-05/143r3 (Mar. 16, 2005).
Shahar et al., "Coordinated association during scanning," IEEE 802.16 Broadband Wireless Access Working Group, IEEE C802.16e-05/143r4 (Mar. 16, 2005).
Shahar et al., "Coordinated association during scanning," IEEE 802.16 Broadband Wireless Access Working Group, IEEE C802.16e-05/143r5 (Mar. 16, 2005).
Shahar et al., "Coordinated association during scanning," IEEE 802.16 Broadband Wireless Access Working Group, IEEE C802.16e-05/143r6 (May 4, 2005).
Shahar et al., "Coordinated association during scanning," IEEE 802.16 Broadband Wireless Access Working Group, IEEE C802.16e-05/143r7 (May 4, 2005).
Shahar et al., "Coordinated association during scanning," IEEE 802.16 Broadband Wireless Access Working Group, IEEE C802.16e-05/143r8 (May 4, 2005).
Sigle et al, "Fair queueing wireless ATM MAC protocols," Ninth IEEE International Symposium on Personal, Indoor and Mobile Radio Communications, pp. 55-59 vol. 1 (1998).
Sigle et al, "Hierarchical Scheduling Strategies for Wireless ATM MAC Protocols," Personal Wireless Communications (Apr. 1998).
Tzavidas et al., "Clarifications on the association procedure," IEEE 802.16 Broadband Wireless Access Working Group, IEEE C802.16e-05/290 (Jun. 8, 2005).
Tzavidas et al., "Clarifications on the association procedure," IEEE 802.16 Broadband Wireless Access Working Group, IEEE C802.16e-05/290r1 (Jun. 13, 2005).
*WI-LAN Inc. et al.* V. *Motorola Mobility LLC et al.*, Motorola Mobility LLC and Motorola Mobility Holdings, LLC's Final Invalidity and Unenforceability Contentions, Civil Action No. 1:19-cv-941 (Sep. 1, 2020).
*WI-LAN Inc. et al.* V. *Motorola Mobility LLC et al.*, Plaintiffs' Final Response to Final Invalidity Contentions Pursuant to LPR 3.2, Civil Action No. 1:19-cv-00941 (Sep. 29, 2020).
*WI-LAN Inc. et al.* V. *LG Electronics, Inc. et al.*, Order Granting Joint Motion to Dismiss and Directing the Clerk to Close the Case, Case No. 3:18-cv-01577-H-AGS (Jan. 9, 2020).
*WI-LAN Inc. et al* V. *Huizhou TCL Mobile Communication Co. Ltd. et al.*, Case No. SACV 19-870 NS (ADSx), Civil Minutes—General, Order Regarding Motion to Stay (Feb. 7, 2020).
*WI-LAN Inc.* v. *Andrei Iancu*, Appeal from the United States Patent and Trademark Office, Patent Trial and Appeal Board in No. IPR2018-00705, Brief for Inventor (Apr. 15, 2020).
*WI-LAN Inc et al..* v. *Andrei Iancu*, Reply Brief of Appellants WI-LAN, Inc., WI-LAN Labs, Inc. & WI-LAN USA, Inc., Case No. 2019-2284, Appeal From the U.S. Patent Office, Patent Trial and Appeal Board No. IPR2018-00705 (May 12, 2020).
*WI-LAN Inc et al.* v. *LG Electronics, Inc. et al.*, Case No. 2019-2284, Initial Brief of Appellants WI-LAN, Inc., WI-LAN Labs, Inc. & WI-LAN USA, Inc., Appeal From the U.S. Patent Office, Patent Trial and Appeal Board No. IPR2018-00705 (Nov. 25, 2019).
Letter from Canadian Intellectual Property Office to Gilbert's LLP re: Patentee's Request for Re-examination of Canadian Patent No. 2686159 (Feb. 14, 2020).
Letter from Canadian Intellectual Property Office to Gilbert's LLP re: Patentee's Request for Re-examination of Canadian Patent No. 2686159 (Jul. 3, 2020).
Letter from Canadian Intellectual Property Office—Certificate of Re-Examination for Canadian Patent No. 2686159 (Jul. 3, 2020).
Re-Examination for Canadian Patent No. 2686159, Clean Claims As-Filed for Reply to Re-Examination (May 14, 2020).
Letter to Canadian Intellectual Property Office re: Re-Examination for Canadian Patent No. 2686159, Reply Under Subsection 48.2(5) of The Patent Act (May 14, 2020).
Re-Examination for Canadian Patent No. 2686159, Re-Examination Response as-filed (Jun. 19, 2020).
Letter from Canadian Intellectual Property Office regarding Re-examination of Canadian Patent No. 2686159 (Jun. 16, 2020).
Hoffman Eitle Reply to Appeal re: Opposition against EP 2 312 900 (Mar. 10, 2020).
*WI-LAN Inc.* v. *LG Electronics, Inc. et al.*, Canadian Federal Court, Order from Court Regarding Dismissal (Jan. 24, 2020).
*Huizhou TCL Mobile Communication Co. Ltd., TCT Mobile (US) Inc. and TCL Mobile Communication (HK) Co., Ltd.*, (Petitioner) v. *Wi-LAN Inc.* (Patent Owner), PTAB Case No. IPR2020-00302, U.S. Pat. No. 8,259,688 B2, Petition for Inter Partes Review of U.S. Pat. No. 8,259,688 B2 (Dec. 24, 2019).
*Huizhou TCL Mobile Communication Co. Ltd., TCT Mobile (US) Inc. and TCL Mobile Communication (HK) Co., Ltd.*, (Petitioner) v. *WI-LAN Inc.* (Patent Owner), PTAB Case No. IPR2020-00302, U.S. Pat. No. 8,259,688 B2, Exhibit 1011, Infringement Contentions by Wi-LAN (Dec. 24, 2019).
*Huizhou TCL Mobile Communication Co. Ltd., TCT Mobile (US) Inc. and TCL Mobile Communication (HK) Co., Ltd.*, (Petitioner) v. *Wi-LAN Inc.* (Patent Owner), PTAB Case No. IPR2020-00302, U.S. Pat. No. 8,259,688 B2, Exhibit 1012, Extended European Search Report dated Mar. 16, 2011 for the European Patent Application No. 10189288.3 (dated Dec. 24, 2019).
*Huizhou TCL Mobile Communication Co. Ltd., TCT Mobile (US) Inc. and TCL Mobile Communication (HK) Co., Ltd.*, (Petitioner) v. *Wi-LAN Inc.* (Patent Owner), PTAB Case No. IPR2020-00302, U.S. Pat. No. 8,259,688 B2, Exhibit 1002, USPTO File History for U.S. Pat. No. 8,259,688 B2 (Dec. 24, 2019).
*Huizhou TCL Mobile Communication Co. Ltd., TCT Mobile (US) Inc. and TCL Mobile Communication (HK) Co., Ltd.*, (Petitioner) v. *Wi-LAN Inc.* (Patent Owner), PTAB Case No. IPR2020-00302, U.S. Pat. No. 8,259,688 B2, Exhibit 1013, J. A. Kemp & Co. Letter dated Oct. 20, 2011 regarding response to European Search Report for European Patent Application No. 10189288.3 (dated Dec. 24, 2019).
*Huizhou TCL Mobile Communication Co. Ltd., TCT Mobile (US) Inc. and TCL Mobile Communication (HK) Co., Ltd.*, (Petitioner) v.

(56) References Cited

OTHER PUBLICATIONS

*Wi-LAN Inc.* (Patent Owner), PTAB Case No. IPR2020-00302, U.S. Pat. No. 8,259,688 B2, Exhibit 1010, Declaration of Dr. Robert Akl, D.Sc. (Dec. 24, 2019).
*Huizhou TCL Mobile Communication Co. Ltd., TCT Mobile (US) Inc. and TCL Mobile Communication (HK) Co., Ltd.*, (Petitioner) v. *Wi-LAN Inc.* (Patent Owner), PTAB Case No. IPR2020-00302, U.S. Pat. No. 8,259,688 B2, Patent Owner's Preliminary Response (dated May 6, 2020).
*Huizhou TCL Mobile Communication Co. Ltd., TCT Mobile (US) Inc. and TCL Mobile Communication (HK) Co., Ltd.*, (Petitioner) v. *Wi-LAN Inc.* (Patent Owner), PTAB Case No. IPR2020-00302, U.S. Pat. No. 8,259,688 B2, Exhibit 2001 to Patent Owner's Preliminary Response (May 6, 2020): *Wi-LAN Inc., et al.* v. *LG Electronics, Inc., et al.*, Case No. 18-cv-01577-H-BGS; Dkt. No. 112, Order: (1) Claim Construction Order; and (2) Denying Defendant's Motion for Partial Summary Judgment that Certain Claims are Invalid as Indefinite (S.D. Cal. May 28, 2019).
*WI-LAN Inc et al.* v. *Andrei Iancu*, Final Judgment, Case No. 2019-2284, Appeal From the U.S. Patent Office, Patent Trial and Appeal Board No. IPR2018-00705 (Oct. 9, 2020).
European Boards of Appeal, Letter of Opponent Hoffmann Eitle, Appeal No. T2306/19-3.5.03 (Dec. 23, 2020).
European Boards of Appeal, Letter of Opponent Hoffmann Eitle, Appeal No. T2306/19-3.5.03 (Jan. 20, 2021).
European Boards of Appeal, Closure of the Appeal Proceedings, Appeal No. T2306/19-3.5.03 (Feb. 2, 2021).
*Wi-Lan Inc. et al.,* v. *Motorola Mobility LLC et al.*, First Amended Complaint for Patent Infringement, Civil Action No. 1:19-cv-00941 (Dec. 16, 2020).

\* cited by examiner

PRE-ALLOCATED RANDOM ACCESS IDENTIFIERS

CROSS REFERENCE TO RELATED APPLICATIONS

This application is a continuation of U.S. patent application Ser. No. 15/193,988, filed Jun. 27, 2016, which is a continuation of U.S. patent application Ser. No. 14/854,747, filed Sep. 15, 2015, which is a continuation of U.S. patent application Ser. No. 14/831,525, filed Aug. 20, 2015, now U.S. Pat. No. 9,226,320 issued Dec. 29, 2015, which is a continuation of U.S. patent application Ser. No. 13/957,173, filed Aug. 1, 2013, now U.S. Pat. No. 9,332,572 issued May 3, 2016, which is a continuation of U.S. patent application Ser. No. 13/565,405, filed Aug. 2, 2012, now U.S. Pat. No. 8,532,052 issued Sep. 10, 2013, which is a continuation of U.S. patent application Ser. No. 11/469,794, filed Sep. 1, 2006, now U.S. Pat. No. 8,259,688 issued on Sep. 4, 2012, which are incorporated by reference as if fully set forth.

BACKGROUND

Wireless communication systems may support discontinuous transmission in which the various parties to a communication link use resources only as needed. Limiting the allocation and consumption of resources to those devices actively engaged in communications increases the capacity of a wireless communication system. However, each device may need to request an allocation of resources before it is granted the opportunity to communicate. The request and grant of communication resources can itself consume a large amount of resources that otherwise could be used to support additional users or provide increased bandwidth to active users.

It is desirable to minimize the amount of resources consumed in requesting and allocating resources for discontinuous communications. However, there remains the need to maximize the flexibility in generating access requests and allocating the resources associated with the access requests.

BRIEF SUMMARY

Systems and methods of pre-allocating identifiers to wireless devices for use in requesting resources over a random access channel are described herein. A wireless communication system includes a random access channel over which wireless devices can anonymously send requests for resources. The base station receiving and processing the anonymous requests reduces the probability of random access channel collisions and conserves the resources needed to support the anonymous requests by pre-allocating one or more codes to select wireless devices. The wireless devices having the pre-allocated codes can transmit a particular code over the random access channel as a request for resources that uniquely identifies the requester.

Aspects of the present disclosure include a method of processing random access identifiers. The method includes determining a set of random access codes, designating at least a subset of the random access codes as allocatable codes, selecting a first code from the subset of random access codes, and assigning the first code to the subscriber station as a first identifier in a random access channel.

Aspects of the present disclosure include a method of processing random access identifiers. The method includes receiving a code value over a random access channel, determining whether the code corresponds to a pre-allocated code, determining an identity of a subscriber station to which the code is allocated, and determining a request from the subscriber station based at least in part on the value of the code.

Aspects of the present disclosure include an apparatus for processing random access identifiers in a wireless communication system that includes a receiver configured to receive information from a subscriber station, a configuration module coupled to the receiver and configured to select at least one allocatable code from a set of random access codes and configured to allocate the at least one code to the subscriber station, and a transmitter configured to transmit to the subscriber station at least one message pre-allocating the at least one allocatable code to the subscriber station.

Aspects of the present disclosure include an apparatus for processing random access identifiers in a wireless communication system that includes a receiver configured to receive a random access code from a subscriber station during a random access channel opportunity and a random access code processor coupled to the receiver and configured to determine if the random access code corresponds to a pre-allocated code, determining an identity of the subscriber station if the random access code is determined to be pre-allocated and determine a response, based at least in part on the random access code.

Aspects of the present disclosure include a method of processing random access identifiers. The method includes receiving at least one random access code allocation from a base station, determining a triggering event for accessing a random access channel, determining whether any of the allocated at least one random access codes corresponds to a request type for the triggering event, selecting a first code of the allocated at least one random access codes corresponding to the request type, and transmitting the first code to the base station over a random access channel.

Aspects of the present disclosure include an apparatus for processing random access identifiers in a wireless communication system that includes a receiver configured to receive at least one allocated random access code from a base station, a storage device coupled to the receiver and configured to store the random access code assignment, a message generator coupled to the storage device and configured to generate a random access channel message having a first access code from the at least one allocated random access code, and a transmitter coupled to the message generator and configured to transmit the random access channel message to the base station over a random access channel.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Methods and apparatus are described for allocating one or more codes to specific subscriber stations and attaching a specific semantic for each distinct code. The use of pre-allocated codes avoids the collision probability associated with random subscriber selected access codes as each subscriber station can potentially be assigned a distinct set of codes. The use of pre-allocated codes allows a base station to react faster to a subscriber station request because it knows more information about the specific request.

The descriptions contained herein generally focus on Orthogonal Frequency Division Multiple Access (OFDMA) wireless communication systems, and particularly are directed towards IEEE 802.16 wireless communication systems. However, the implementation of pre-allocated codes in an IEEE 802.16 system is used merely as an example. The use of pre-allocated random access identifiers in a wireless communication system can be implemented in virtually any type of wireless communication system.

Figure 1:
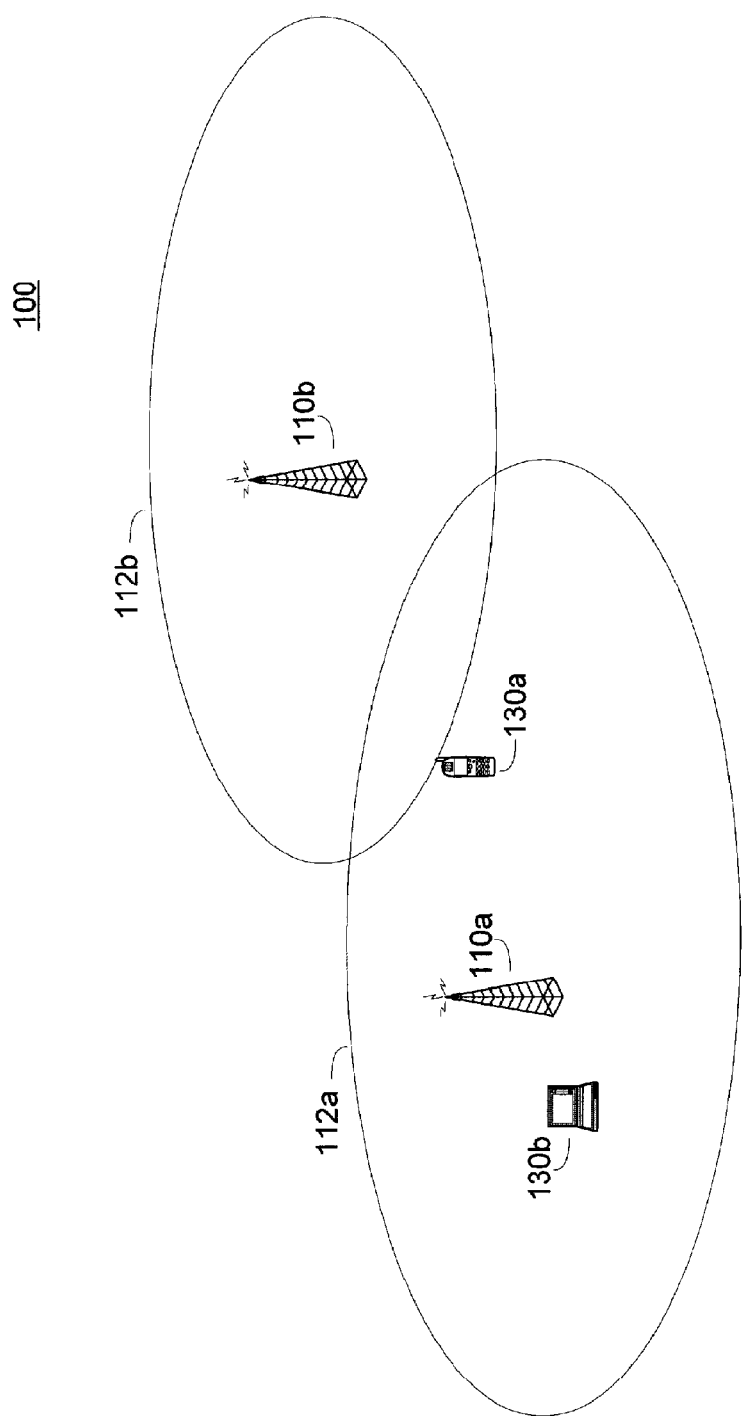
FIG. 1 is a simplified functional block diagram of an embodiment of a wireless communication system.

FIG. 1 is a simplified functional block diagram of an embodiment of a wireless communication system 100. The wireless communication system 100 includes a plurality of base stations 110a, 110b, each supporting a corresponding service or coverage area 112a, 112b, Each base station 110a and 110b can be coupled to a network (not shown) such as a wired network, and can be configured to allow wireless communication with devices on the wired network.

A base station, for example 110a, can communicate with wireless devices within its coverage area 112a. For example, the first base station 110a can wirelessly communicate with a first subscriber station 130a and a second subscriber station 130b within the coverage area 112a. In another example, the first subscriber station 130a can communicate with a remote device (not shown) via the first base station 110a. In another example, the first subscriber station 130a can communicate with the second subscriber station 130b via the first base station 110a.

The base stations, 110a and 110b, can be part of the same communication network or can be part of distinct communications networks. The base stations 110a and 110b can be in communication with each other, either through a direct communication link or via an intermediary network. Alternatively, where the base stations 110a and 110b are in distinct networks, a first base station 110a may have no knowledge regarding the operation of the second base station 110b.

There may be any number of base stations 110a and 110b within a wireless communication system 100, although FIG. 1 depicts only two base stations 110a and 110b. The base stations 110a and 110b alternatively can be referred to as access points or nodes.

Although only two subscriber stations 130a and 130b are shown in the wireless communication system 100, the system can be configured to support virtually any number of subscriber stations. The subscriber stations 130a and 130b can be mobile stations or stationary stations. The subscriber stations 130a and 130b alternatively can be referred to, for example, as mobile stations, mobile units, or wireless terminals.

A mobile station can be, for example, a wireless handheld device, a vehicle mounted portable device, or a relocatable portable device. A mobile subscriber station can take the form of, for example, a handheld computer, a notebook computer, a wireless telephone, or some other type of mobile device.

In one example, the wireless communication system 100 is configured for Orthogonal Frequency Division Multiple Access (OFDMA) communications. For example, the wireless communication system 100 can be configured to substantially comply with a standard system specification, such as IEEE 802.16 or some other wireless standard. The wireless communication system 100 can support the pre-allocated access identifiers described herein as an extension to the system standard or as part of a system standard.

The wireless communication system 100 is not limited to an OFDMA system, and use of the pre-allocated access identifiers described herein is not limited to application in OFDMA systems. The description is offered for the purposes of providing a particular example of the operation of a pre-allocated access identifiers in a wireless communication environment.

The base stations 110a and 110b are configured to transmit data packets to the subscriber stations 130a and 130b organized in frames using one or more slots. The term "downlink" is used to refer to the direction of communication from the base station, e.g. 110a, to a subscriber station, e.g. 110a. Each slot can include a predetermined number of Orthogonal Frequency Division Multiplex (OFDM) subcarriers, symbols, or a combination of subcarriers and symbols.

Each base station, for example 110a, can supervise and control the communications within its respective coverage area 112a. Each active subscriber station, for example 130a, registers with the base station 110a upon entry into the coverage area 112a. The subscriber station 130a can notify the base station 110a of its presence upon entry into the coverage area 112a, and the base station 110a can interrogate the subscriber station 130a to determine the capabilities of the subscriber station 130a.

The base station 110a assigns a temporary identifier to the subscriber station 130a for use identifying the subscriber station 130a to the base station 110a. The temporary identifier can be referred to as a Connection Identifier (CID). The system can allocate a predetermined range for the CID, and reserves a number of bits necessary to support the maximum CID value in each message requiring a CID value.

In a packet based wireless communication system 100, it may be advantageous for the system to allocate resources as needed, rather than maintaining an active channel assignment for each subscriber station 130a or 130b having an established communication session with a base station 110a or 110b. The base station 110a can allocate resources to the subscriber station 130a on an as needed basis. For example, in an OFDM system, the base station 110a can allocate time and frequency resources to each subscriber station 130a when the subscriber station 130a has information to send to the base station 110a.

The communication link from the subscriber station 130a to the base station 110a is typically referred to as the "uplink." The base station 110a can allocate uplink resources to the subscriber station 130a to avoid collisions that may occur if the subscriber stations 130a or 130b are allowed random access to the resources. The base station 110a can allocate the uplink resources in units of frames and OFDM subcarriers. Additionally, the base station 110a can specify a modulation format, an encoding rate, Forward Error Correction (FEC), and the like, or some combination thereof in the resource allocation messages.

The subscriber stations 130a and 130b can notify the serving base station, for example, 110a, when the subscriber stations 130a and 130b are reporting information to the base station 110a or when the subscriber stations 130a and 130b request uplink resources. Each base station, for example 110a, can allocate some resources to support a random access channel (RAC) used by the subscriber stations 130a and 130b to report or request resources. The base station 110a can periodically allocate resources to support the random access channel. In one embodiment, the base station 110a can support a random access channel in each uplink frame. For example, a base station 110a can allocate a portion of the uplink to a random access channel. The base station 110a can allocate, for example, a time, duration, and number of OFDM subcarriers on the uplink portion for the random access channel. Each of the random access channel parameters may be static or may be dynamic. The base station 110a can include the random access channel allocation information in a downlink portion that is broadcast across its associated coverage area 112a.

The information bandwidth of the random access channel may be limited due to, for example, a limited duration or limited number of subcarriers allocated to supporting the channel. Thus, each subscriber station, for example 130a, can notify the base station 110a by transmitting an identifier on the random access channel. The base station 110a can respond to the information it receives over the random access channel.

The subscriber stations 130a and 130b can use virtually any identifier in a request over the random access channel. However, wireless communication standards typically specify the types of identifiers and methods of communicating information over a random access channel.

The IEEE 802.16 wireless communication standard specifies 256 distinct pseudorandom codes and four corresponding usage types for conveying information over a random access channel. The four usage types include initial ranging, periodic ranging, bandwidth request, and handover. Each base station, for example 110a, can support a distinct set of 256 pseudorandom codes. A subscriber station 130a can generate the set of pseudorandom codes associated with a particular base station 110a based on a base station 110a identifier or sector identifier and a predetermined generator polynomial.

The base station 110a can define groups or ranges of pseudorandom codes, also referred to as Code Division Multiple Access (CDMA) codes or merely codes, for each usage type. A subscriber station 130a having a need to communicate information with the base station 110a can randomly select a code from the available group of codes corresponding to a usage type. The subscriber station 130a sends the randomly selected code corresponding to the usage type to the base station 110a over the random access channel. The subscriber station 130a can modulate the subcarriers of the random access channel with the selected code using a predetermined modulation type, for example, BPSK.

For example, if the subscriber station 130a needs to send a bandwidth request to a serving base station, 110a, the subscriber station 130a selects a code from the group of codes associated with bandwidth requests assigned by the base station 110a. The subscriber station 130a transmits the code to the base station 110a and the base station 110a responds by granting a typically small amount of bandwidth to allow the subscriber station 130a to transmit the specific request.

The base station 110a receiving the code over the random access channel does not yet know the identity of the transmitting subscriber station 130a. The base station 110a can only identify the purpose of the request, based on the group in which the code belongs. The subscriber station 130a sends the code to notify the base station 110a of a pending request. The base station 110a grants a small portion of bandwidth, based on the usage type indicated by the code, to allow the subscriber station 130a to transmit details of the request. This multiple stage access has a large associated latency and is rather cumbersome for many transactions.

Additionally, there is a finite probability of code collision, where two distinct subscriber stations 130a and 130b select the same code for transmission in the same instance of the random access channel. The wireless communication system 100 can define a random backoff, using a random backoff algorithm implemented in each subscriber station 130a and 130b, to address the possibility of collisions. However, collisions increase the latency from the time of the initial request to the time of servicing the request.

The wireless communication system 100 can alleviate at least some of the latency by pre-allocating one or more codes to each subscriber station 130a and 130b. A base station 110a can pre-allocate one or more codes to each subscriber station 130a and 130b that is registered within its coverage area 112a. Each pre-allocated code can also have an associated semantic. The base station 110a can reserve some codes for use by subscriber stations not having a pre-allocated code for a particular usage type or instance.

Figure 2:
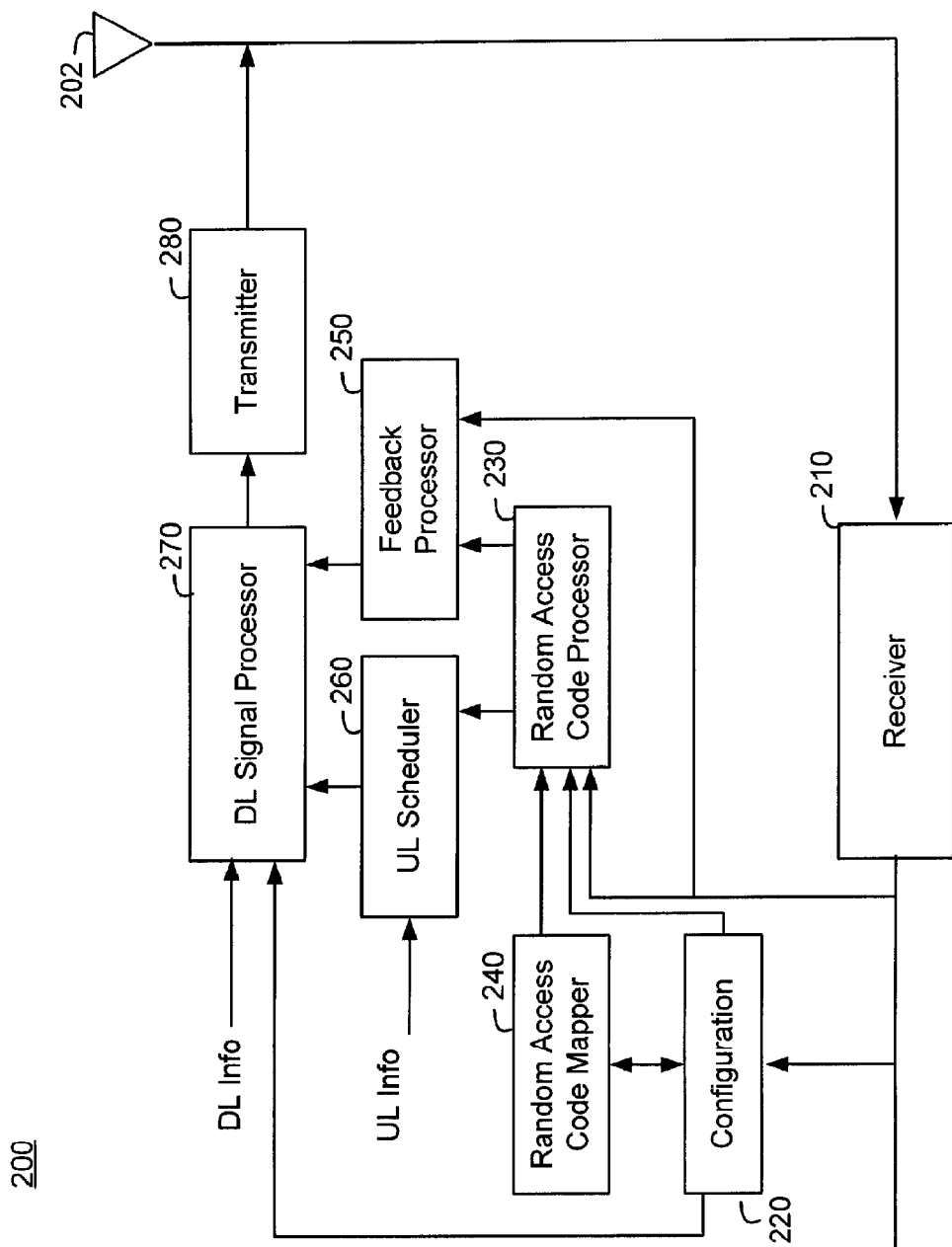
FIG. 2 is a simplified functional block diagram of an embodiment of a base station implementing pre-allocated random access identifiers.

FIG. 2 is a simplified functional block diagram of an embodiment of a base station 200 configured to perform assignment and processing of pre-allocated codes. The base station 200 can be, for example, one of the base stations in the wireless communication system of FIG. 1.

The base station 200 is configured to pre-allocate one or more codes to a subscriber station registering in the coverage area. The base station 200 supports communicating random access channel messages using pre-allocated codes as well as random access channel messages using subscriber station selected codes. The base station 200 pre-allocates one or more codes to registered subscriber stations that support pre-allocated codes. The base station 200 tracks the code allocation such that each of the allocatable codes are allocated to at most one subscriber station at a time. The subscriber station having pre-allocated codes releases the pre-allocated codes when it de-registers with the base station 200.

In another embodiment, a plurality of base stations 200 may share a pool of codes for allocation to subscriber stations. A base station 200 can pre-allocate a code to a particular subscriber station and the subscriber station can use the pre-allocated code for communicating with a plurality of base stations, for example, the plurality of base stations participating in a communication handoff. In another embodiment, a base station 200 can pre-allocate a code to a particular subscriber station and the subscriber station may use the pre-allocated code for communicating with any base station belonging to a predetermined group of base stations, such as a system wide group of base stations.

The base station 200 includes an antenna 202 that can be coupled to a receiver 210 and transmitter 280 within the base station 200. Although FIG. 2 illustrates a single antenna 202, the antenna 202 can be one or more antenna configured to support the transmit and receive operating bands. If the base station 200 supports frequency division multiplexing of the transmit and receive bands, the base station 200 can include a duplexor (not shown) to isolate the transmit signals from the receiver 210. The receiver 210 and transmitter 280 can be distinct or can be part of a transceiver.

Code Pre-Allocation

The receiver 210 is configured to receive the uplink transmissions broadcast by the subscriber stations (not shown). Initially, a subscriber station can synchronize and register with a base station 200 once the subscriber station enters a coverage area of the base station 200 or upon waking up from a sleep or idle state.

The subscriber station transmits an initial ranging signal over a ranging channel defined by the base station 200. The ranging channel can be, for example, the random access channel.

The receiver 210 receives the initial transmissions from the subscriber station and couples them to a configuration module 220. The configuration module 220 operates to register the subscriber station in a manner set forth in a wireless standard. For example, the configuration module 220 can assign and track a connection identifier assigned to the subscriber station.

The configuration module 220 can track the set of codes that may be used in the random access channel in conjunction with a random access code mapper 240. The random access code mapper 240 is configured to track the complete list of random access codes, their designation as open codes or allocatable codes, the usage type groups, and their status as allocated or available for allocation.

In one embodiment, the random access code mapper 240 can be configured to generate the entire set of available codes and store the set in memory. The random access code mapper 240 can associate usage types with subsets of the codes. For example, the random access code mapper 240 can associate a distinct subset of codes with each of four usage types, where the usage types include initial ranging, periodic ranging, bandwidth request, and handover.

The random access code mapper 240 can similarly designate a first portion of codes as allocatable codes and a distinct second portion of codes as open codes, where an open code refers to a code that will not be assigned to any particular subscriber station but can be randomly selected by subscriber stations for use in a random access channel message. The random access code mapper 240 can designate the first and second portions in such a manner that the union of the two portions includes the entire group of codes. For example, the random access code mapper 240 can define five distinct code groups from N possible codes, one for each of four usage types and one for allocatable codes. The first group (0 through i) can be assigned to initial ranging, the second group ((i+1) though p) can be assigned to periodic ranging, the third group ((p+1) through b) can be assigned to bandwidth requests, the fourth group ((b+1) through h) can be assigned to handoffs, and the fifth group ((h+1) through N) can be assigned as allocatable codes. Further, the allocatable codes can be divided by purpose or function. The random access code mapper 240 thus allows the base station 200 to support both pre-allocated codes as well as codes that are randomly selected by subscriber stations.

If the configuration module 220 determines that the registering subscriber station is capable of supporting pre-allocated codes, such as via a capabilities negotiation phase of the registration process, the configuration module 220 can examine the code map in the random access code mapper 240 to determine which of the allocatable codes are available.

The configuration module 220 can be configured to allocate one or more codes to a particular subscriber station based on a variety of factors. Although the description provided herein focuses on allocating codes as part of the registration process, the configuration module 220 is not limited to allocating codes as a result of, or during, registration of the subscriber station. In some embodiments, the configuration module 220 operates to allocate codes to a subscriber station independent of any registration process, and independent of a capabilities negotiation that occurs during a registration process.

The configuration module 220 can be configured to monitor, either directly or indirectly, mobility of a subscriber station and can be configured to allocate one or more codes based on a measure of the mobility. Additionally, the configuration module 220 can be configured to determine characteristics of communications with a subscriber station and allocate one or more codes based on the characteristics of the communications. For example, the base station 200 can communicate with a subscriber station over a link characterized as a "best effort" level of connection. The configuration module 220 can be configured to allocate one or more codes to the subscriber station based on the base station 200 supporting a "best effort" communication link with the subscriber station. Similarly, the subscriber station may communicate real time traffic such as voice or real time video via the base station 200. Real time traffic may be more sensitive to latency and the latency requirements may not support a request for retransmission of erased or otherwise corrupted information. The configuration module 220 can determine if a communication link to a subscriber station is in support of real time traffic and can allocate one or more codes to the subscriber station based on the base station 200 supporting a real time traffic communication link with the subscriber station.

The configuration module 220 can utilize other factors and parameters in determining whether to allocate one or more codes to a subscriber station. The examples described herein are illustrative of the types of factors that the configuration module 220 may consider and are not intended as limitations on the operation of code pre-allocation.

The configuration module 220 can select one or more allocatable codes and pre-allocate them to a registering subscriber station. The configuration module 220 can pre-allocate multiple codes to a single subscriber station for any of a variety of reasons. The configuration module 220 can pre-allocate a distinct code for each of a plurality of usage types. The configuration module 220 can also pre-allocate multiple codes within the same usage type with each distinct code attached to a distinct semantic. For example, the configuration module 220 can allocate two distinct codes within the bandwidth request usage type. A first code can represent a first bandwidth request and a second code can represent a distinct bandwidth request. In another example, the configuration module 220 can allocate two distinct codes within the bandwidth request usage type, where each of the codes can represent a different requested class of service.

Once the configuration module 220 selects an allocatable code from the code map, the random access code mapper 240 identifies the code as allocated and no longer available for allocation. The base station 200 can pre-allocate each code for an indefinite duration or for a predetermined duration. The base station 200 can pre-allocate some codes for an indefinite duration while pre-allocating other codes to the same subscriber station for a predetermined duration.

In one embodiment, the base station 200, via the configuration module 220, pre-allocates codes for an indefinite duration. The subscriber station releases one or more pre-allocated codes upon a predetermined event. For example, a subscriber station releases any pre-allocated codes when it de-registers with the base station 200 such as when leaving the base station coverage area or when transitioning to an unregistered state such as sleep or idle. As another example, a subscriber station can be given a pre-allocated code for use in a handoff to communicate with the plurality of base stations participating in the handoff, and the subscriber station can release the pre-allocated code upon completion of the handoff. In another embodiment, the configuration module 220 pre-allocates one or more codes for a predetermined duration. The pre-allocated code can expire and be released at the end of the predetermined duration. Alternatively, the pre-allocated code can conditionally expire at the end of the duration based on some event. For example, a pre-allocated code may expire unless the subscriber station takes some explicit action to renew the pre-allocated code. In yet another embodiment, the configuration module 220 can revoke or otherwise terminate a pre-allocated code assignment The configuration module 220 and random access code mapper 240 can determine the release or termination of pre-allocated codes and can update the code map accordingly.

The base station 200 pre-allocates the codes to a subscriber station by generating a pre-allocation message to the subscriber station including the codes identified by the configuration module 220. The base station 200 can generate a downlink message to the subscriber station having the pre-allocation message. The base station 200 can support virtually any type of pre-allocation message, and the specific manner in which a code is pre-allocated to a subscriber station is not limited to any particular format or message.

For example, the configuration module 220 can generate a type-length-value (TLV) triplet to the subscriber station with the pre-allocated code. The base station 200 can transmit the TLV triplet in a TLV exchange occurring during the capability negotiation phase with the subscriber station. The configuration module 220 can generate a distinct TLV triplet for each pre-allocated code. In another embodiment, the configuration module 220 can generate a dedicated message to the subscriber station including the pre-allocated codes that is transmitted in the downlink. In yet another embodiment, the configuration module 220 can generate a code allocation message to a specific subscriber station and can include the pre-allocation message in an extended sub-header portion of a MAC Payload Data Unit (PDU) directed to the subscriber station, where the MAC is the unique MAC address corresponding to the subscriber station.

The configuration module 220 generates a pre-allocation message and couples the message to the downlink processor 270. Alternatively, the configuration module 220 can provide the pre-allocated codes, associated semantics, and the identify of the subscriber station to the downlink processor 270, and the downlink processor 270 can generate the pre-allocated code message.

In one embodiment, the downlink processor 270 maps the pre-allocated message to one or more subcarriers of one or more OFDM symbols. The downlink processor 270 couples the OFDM symbols to the transmitter 280 where the OFDM symbols are filtered, amplified, and frequency converted to a desired operating band, where they are transmitted across the coverage area via the antenna 280.

Once the subscriber station receives the pre-allocated code assignment, the subscriber station can transmit one or more codes to the base station 200 over the random access channel. The subscriber station can select the code, whether pre-allocated or random, based in part on the usage type of the request.

Random Access Channel Code Processing

The base station 200 can periodically allocate a random access channel in the uplink. The uplink scheduler 260 can determine the timing and uplink resources to allocate to supporting a random access channel. For example, the uplink scheduler 260 can allocate to the random access channel a predetermined number of subcarriers out of a predetermined number of symbols in an uplink frame. The uplink scheduler 260 can generate an Uplink-Map (UL-MAP) that is coupled to the downlink signal processor 270 for inclusion in the downlink symbols. The transmitter 280 transmits the UL-MAP as part of the downlink frame.

The subscriber stations in the base station 200 coverage area receive the UL-MAP and can determine the resource allocation for the random access channel. The subscriber stations can each generate a code for transmission to the base station 200 over the random access channel.

The base station 200 receives the uplink transmissions, including the one or more OFDM symbols including the random access channel. The receiver 210 processes the uplink OFDM symbols to recover the underlying data and information. There may be many channels supported in any given received OFDM symbol, and the receiver 210 can extract and recover the data for each of the channels.

The receiver 210 can, for example, amplify, filter, and downconvert the received OFDM symbols to baseband OFDM symbols. The receiver 210 can extract the information carried in the symbols by transforming the time domain samples to the corresponding OFDM frequency domain subcarriers. The receiver 210 can demodulate each of the subcarriers in a manner that is dependent, at least in part, on the channel to which the subcarrier is assigned. For example, the receiver 210 can be configured to BPSK demodulate the subcarriers assigned to the random access channel to recover the data. The receiver 210 can map the demodulated subcarrier data to the respective channels to recover the underlying data.

The receiver 210 couples the codes recovered from the random access channel to a random access code processor 230. The random access code processor 230 compares the received codes to the random access code map from the random access code mapper 240 to determine the corresponding usage type and to determine if the code corresponds to a pre-allocated code.

If the random access code processor 230 determines that the received code has not been pre-allocated to a specific subscriber station, the random access code processor 230 signals the UL scheduler 230 based on the usage type of the received code. The UL scheduler 260 may allocate some uplink bandwidth for the subscriber station to provide additional information depending on the usage type associated with the received code.

However, if the random access code processor 230 determines that the received code has been pre-allocated to a specific subscriber station, the random access code processor 230 communicates with the configuration module 220 to determine the identity of the subscriber station. The random access code processor 230 can, for example, compare the received code to a look up table or relational database in the configuration module 240 and determine the associated subscriber station. The random access code processor 230 can also determine if the code has a defined semantic distinct from the usage type. For example, the random access code processor 230 can determine that the code corresponds to a bandwidth request of a specific number of bytes.

The random access code processor 230 couples the subscriber station identity and the specific resource request to the UL scheduler 260 to allow the UL scheduler 260 to allocate the requested resources to the subscriber station in the UL-MAP. For example, if the received code corresponds to a specific bandwidth request, the UL scheduler 260 can grant the resource allocation in the UL-MAP. Without the pre-allocated code, the base station 200 would need to initially grant a small amount of bandwidth to the source of the code in order to identify the subscriber station transmitting the code and to identify the amount of bandwidth requested.

The random access code processor 230 can also notify the feedback processor 250 when the base station 200 receives a pre-allocated code. The feedback processor 250 can be configured to monitor the signals received by the receiver 210. The feedback processor 250 can monitor, for example, receive signal parameters that are corrected in closed loop control. The feedback processor 250 can monitor, for example, the power of the received signals, the timing of the received signals, and the frequency of the received signals. For each monitored parameter, the feedback processor can generate feedback data or a feedback message directed to the originating subscriber station.

The feedback processor 250 can monitor the received power using a detector, using a processor to calculate a power of a digital representation of the received signal, and the like, or some other manner of determining the received power. The power can be averaged over some predetermined time duration. The feedback processor 250 determines the power of the received signal corresponding to each of the distinct signal sources. The feedback processor 250 can be configured to generate a feedback signal that is used in a power control loop that controls the transmit power of the subscriber station. For example, the feedback processor 250 can generate a control signal or message to instruct a subscriber station to increase or decrease the transmit signal power and that may provide some indication of the magnitude of the change.

Similarly, the feedback processor 250 can monitor timing of the received signal. In an OFDM system, the base station 200 can allocate uplink resources to a subscriber station by allocating subcarriers and the time or OFDM symbols in which those subcarriers are allocated. The feedback processor 250 can monitor the received signal to determine the timing of the received signal from a particular subscriber station relative to its allocated time. The feedback processor 250 can generate a feedback control signal or message to instruct the subscriber station to advance or delay its transmission time, in order to better align with the system timing.

The feedback processor 250 can also monitor the frequency of the received signal to determine if there is a frequency offset from an ideal received frequency. The feedback processor 250 can generate a feedback control signal or message to instruct the subscriber station to increase or decrease its transmit frequency and can provide some indication of the magnitude of the change. Alternatively, the feedback processor 250 can generate a feedback control signal or message that is indicative of the frequency offset relative to a desired receive frequency.

The feedback processor 250 couples the various control signals or feedback messages to the downlink signal processor, where they are configured in a downlink message that is directed to the particular subscriber station. The feedback processor 250 can concurrently monitor the receive signal from several subscriber stations, and the downlink signal processor 270 can be configured to generate a downlink signal to each of the subscriber stations having the relevant feedback information.

If the random access code processor 230 determines that the code received in the random access channel is a pre-allocated code, the feedback processor can associate the signal received over the random access channel with the originating subscriber station. The knowledge of the identity of the subscriber station originating the random access channel code allows the feedback processor 250 to generate a feedback message that is relevant to the originating subscriber station.

In the condition where the code received over the random access channel is not a pre-allocated code, the feedback processor 250 has no knowledge of the identity of the originating subscriber station and therefore, does not have the ability to associate the feedback information to a particular subscriber station. Any correction determined based on an anonymous code is broadcast across the coverage area to ensure receipt by the originating subscriber station.

Subscriber Station

Figure 3:
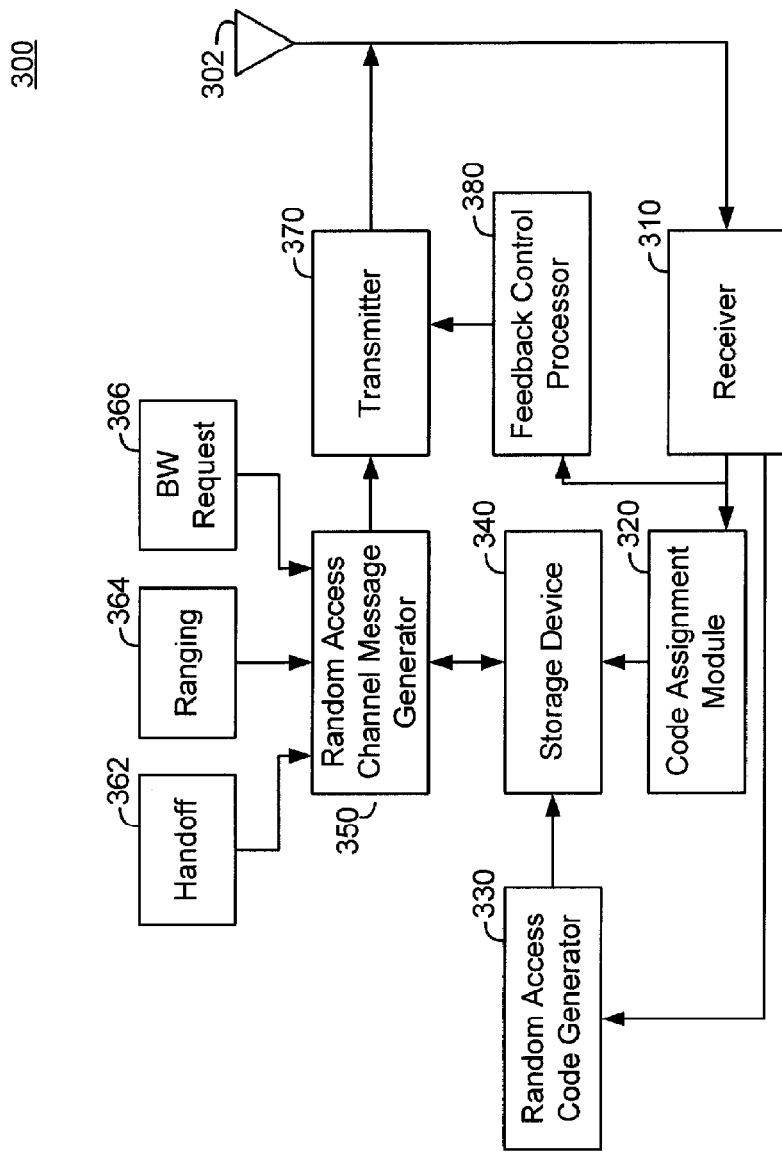
FIG. 3 is a simplified functional block diagram of an embodiment of a subscriber station implementing pre-allocated random access identifiers.

FIG. 3 is a simplified functional block diagram of an embodiment of a subscriber station 300. The subscriber station 300 is configured to utilize pre-allocated codes assigned by a base station, such as the base station of FIG. 2. The subscriber station 300 can be, for example, a subscriber station of the wireless communication system of FIG. 1.

The simplified functional block diagram of FIG. 3 is limited to those functional blocks related to the processing of random access channel codes and the associated information. The functional blocks relating to other aspects of the subscriber station 300 are omitted for the sake of clarity.

The subscriber station 300 includes an antenna 302 for interfacing with the wireless channel. The subscriber station 300 includes a receiver 310 coupled to the antenna to receive and process the received signals that originate from base stations. Additionally, the subscriber station 300 includes a transmitter 370 to process signals for transmission to a base station via the antenna 302.

A subscriber station 300 registers with a base station upon entry into the coverage area and may re-register upon waking from a sleep or idle state. The subscriber station 300 can initially receive overhead information that indicates general parameters, such as the identity of the base station, the date, and other overhead information, and engages in a capabilities negotiation with the base station, in part, using the overhead information. For example, the base station may broadcast an Uplink Channel Descriptor (UCD) that includes a usage type map for the random access codes. The base station can also transmit a UL-MAP that provides the random access channel allocation in the uplink.

The subscriber station 300 receives the overhead information in one or more OFDM symbols. The receiver 310 processes the received symbols to extract the overhead information and couples the base station cell identification to a random access code generator 330. In other embodiments, the receiver 310 couples a base station sector identification to the random access code generator if the base station supports a sectorized coverage area. The random access code generator 330 uses the base station cell identification in conjunction with a predetermined generator function to generate all possible random access codes supported by the base station. The random access code generator 330 can store the codes in a storage device 340, which can include one or more memory devices.

The subscriber station 300 also receives the UCD information from the base station and couples the UCD information to a code assignment module 320. The UCD information includes the usage type map for the random access codes. The code assignment module 320 can associate the usage types to the codes stored in the storage device. In some instances, the usage type map received from the base station may not map all of the codes. The code assignment module 320 can presume that those codes absent from the usage type map represent codes reserved for pre-allocation, and that the reserved codes are not to be randomly selected for a random access channel request and can indicate in the storage device that the codes are reserved or can otherwise indicate that the codes are not available for selection. In another embodiment, the usage type map can explicitly label a group of one or more codes reserved for pre-allocation.

A random access channel message generator 350 can generate an initial ranging message by selecting an initial ranging code from the list of available codes in the storage device. The random access channel message generator 350 couples the selected initial ranging code or the initial ranging message that is generated using the selected initial ranging code to the transmitter 370. The transmitter 370 is configured to generate the OFDM symbols having the initial ranging message, for example, by BPSK modulating the selected initial ranging code onto a plurality of subcarriers allocated to the random access channel. The transmitter 370 transmits the message to the base station during a ranging opportunity, where the ranging opportunity occurs over a combination of time and frequency resources allocated to the random access channel.

The subscriber station 300 and base station can engage in a capabilities negotiation phase that is part of the registration process. During the capabilities negotiation phase, the subscriber station and base station can exchange their capabilities. The capabilities exchange may be direct, where each party to the communication submits its capabilities or queries the other party as to its capabilities. The capabilities exchange may also be indirect, where each party reveals its capabilities or learns of the other party's capabilities through examination or query of a parameter that indirectly refers to the capabilities. For example, in a subscriber station, a manufacturer model number or a software version associated with a baseband processor may indirectly indicate the capabilities of the subscriber station. Some capabilities may be exchanged directly while others are exchanged indirectly.

As a result of the capabilities negotiation phase, the subscriber station 300 will indicate its ability to support the pre-allocated codes. The subscriber station 300 can then receive one or more pre-allocated codes to which it is assigned. The subscriber station 300 can also receive a usage type and a semantic associated with each pre-allocated code.

The pre-allocated codes and their corresponding usage types or semantics can be received by the subscriber station 300 in a Type, Length, Value (TLV) exchange with the base station. Alternatively, the subscriber station 300 can receive the pre-allocated codes and associated information in one or more dedicated messages, extended subheaders, or some other manner of conveying information to the subscriber station 300.

The receiver 310 couples the pre-allocated code information to the code assignment module 320. The code assignment module 320 can update the code values stored in the storage device 340 to indicate the pre-allocated codes and the associated information, such as usage type and semantic.

After the subscriber station 300 has completed registration and remains registered with the base station, the subscriber station 300 can communicate over the random access channel using the pre-allocated codes. The subscriber station 300 can include a number of modules that are configured to monitor for events that create the need to transmit a request to the base station over the random access channel.

The subscriber station 300 can include a handoff module 362, a ranging module 364, and a bandwidth request module 366 that monitor the performance and activities of the subscriber station 300 and determine when it is desirable to transmit a code over the random access channel to the base station. The handoff module 362 can be configured to monitor the link with the serving base station, and can be configured to monitor the strength of candidate base stations. The handoff module 362 can direct the subscriber station 300 to initiate a handoff when the conditions warrant.

The ranging module 364 can be configured to support the initial ranging with the base station that can be used to synchronize with the system. Additionally, the ranging module 364 can be configured to monitor and support periodic ranging that may need to be performed by the subscriber station 300. During periodic ranging, the subscriber station 300 can transmit a ranging code over the random access channel and the base station may correct the timing offset and power control in a feedback message to the subscriber station 300.

A bandwidth request module 366 can track the uplink information generated or otherwise received at the subscriber station 300 and available for transmission over an uplink channel. The bandwidth request module 366 can be configured to initiate a bandwidth request to request an allocation of uplink resources. The bandwidth request module 366 can monitor, for example, the type of information to be transmitted on the uplink. For example, voice information may be relatively low density, but may have constraints regarding the latency. Likewise, there may be data intensive transmissions that have less stringent latency requirements.

When any of the modules determines a need to transmit a code over the random access channel, the relevant module, for example the bandwidth request module 366, indicates the event to the random access channel message generator 350. The random access channel message generator 350 determines the usage type associated with the request, which in this example is a bandwidth request. The random access channel message generator 350 examines the codes stored in the storage device 340 to determine whether the subscriber station has been pre-allocated one or more codes for bandwidth requests.

If the random access channel message generator 350 determines that there are no pre-allocated codes for the particular usage type, the random access channel message generator 350 selects a code randomly from the available codes of the desired usage type. The random access channel message generator 350 assembles the message and couples it to the transmitter 370 for transmission over the random access channel.

If the random access channel message generator 350 determines that there is at least one pre-allocated code of the desired usage type, the random access channel message generator 350 determines whether any of the pre-allocated codes has a semantic that supports the event indicated by the bandwidth request module. For example, the subscriber station 300 can be allocated a number of bandwidth request codes, each with a different semantic attached. A first semantic attached to a first pre-allocated code can indicate a particular bandwidth request, such as a first number of bytes, while a second semantic attached to a second pre-allocated code can indicate a second bandwidth request having a second number of bytes distinct from the first number of bytes.

The random access channel message generator 350 selects the pre-allocated code having the desired semantic and assembles a random access control message using the code. If no pre-allocated codes have the desired semantic, but there exists a pre-allocated code having no semantic attached, the random access channel message generator 350 selects the pre-allocated code having no semantic attached. If there is no pre-allocated code with no semantic attached, the random access channel message generator 350 randomly selects a code just as in the case where the subscriber station 300 has no pre-allocated codes.

The subscriber station 300 can receive a ranging correction message in response to any request using a pre-allocated code. The receiver 310 receives the correction message, which can be a feedback control message, and couples the message to a feedback control processor 380. The feedback control processor 380 can process the feedback control message and can adjust the operating parameters of the transmitter 370. For example, the feedback control processor 380 can direct the transmitter 370 to increase the transmit power or to adjust a timing offset.

Process Descriptions

Figure 4:
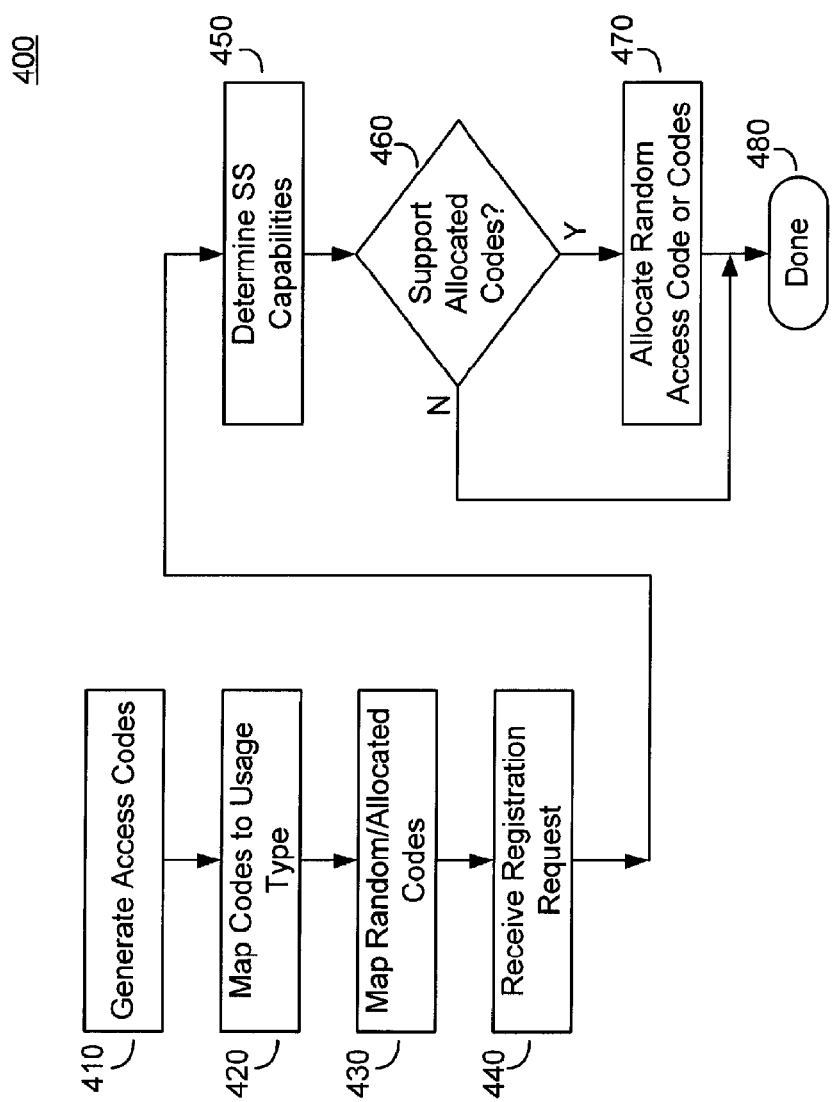
FIG. 4 is a simplified flowchart of an embodiment of allocating random access identifiers.

FIG. 4 is a simplified flowchart of an embodiment of a method 400 of allocating random access identifiers. The random access identifiers can be, for example, the CDMA codes used in the random access channel of a IEEE 802.16 wireless communication system. The method 400 can be implemented, for example, by a base station of FIG. 1 or the base station of FIG. 2.

The method 400 begins at block 410, where the base station generates a list of all the available random access codes supported by the base station. The base station can generate the list using, for example a generator polynomial and a cell identification value. The base station need not generate the codes every time that they are needed, but rather, may generate or otherwise be provided the codes one time and may store the list of codes in a memory as a look up table, database, or some other record.

The base station proceeds to block 420 and maps the codes to specific usage types. The base station can support a predetermined number of usage types, such as initial ranging, periodic ranging, bandwidth request, and handover. The base station can, for example, select a range of codes that corresponds to each of the usage types. The base station can identify each code with its associated usage type in the look up table having the list of codes.

The base station proceeds to block 430 and maps the codes to one or the other set of open or allocatable codes. The base station can configure the codes such that it supports only open codes, only allocatable codes, or a combination of open and allocatable codes. The base station identifies each code in the look up table as either open or allocatable. The term "open" refers to a code that will not be allocated to a particular subscriber station, but instead, remains open for random selection by a subscriber station. In contrast, the term "allocatable" refers to those codes that the base station can select for pre-allocation to a particular subscriber station.

The base station proceeds to block 440 and receives a registration request from a subscriber station. The base station may limit active communication sessions to those subscriber stations registered with the base station. Typically, each subscriber station registers with the serving base station upon entry into the coverage area. Alternatively, the base station may receive a subscriber basic capability request from the subscriber station.

The base station proceeds to block 450 and determines the subscriber station capabilities based on the subscriber station basic capability request or the registration request or other direct or indirect information. For example, the base station can enter a capabilities negotiation with the subscriber station. The base station proceeds to decision block 460 and determines, based on the capabilities negotiation, whether the subscriber station supports pre-allocated codes.

If the base station determines that the subscriber station does not support pre-allocated codes, the base station proceeds from decision block 460 to block 480 and is done. However, if the base station determines that the subscriber station supports pre-allocated codes, the base station proceeds from decision block 460 to block 470 and pre-allocates one or more random access codes to the subscriber station.

In one embodiment, the base station can determine the usage types and associated semantics for which to pre-allocate a code based on one or more parameters associated with the subscriber station. The base station may have a limited number of codes which can be pre-allocated, and may preferentially allocate codes to subscriber stations based on some subscriber station parameter. For example, the base station can perform preferential pre-allocation of codes to those subscriber stations identified as mobile devices.

The base station can pre-allocate a distinct code for each of a plurality of bandwidth requests, classes of service, or some other factor based in part on the results of the capabilities negotiation. For example, the base station may pre-allocate a plurality of bandwidth request usage types to the same subscriber station and each bandwidth request code may be attached to a distinct semantic that indicates the size of the bandwidth request. Then, if the base station receives the pre-allocated code in the random access channel, the base station knows both the identity of the subscriber station as well as the size of the bandwidth request. The base station can immediately allocate the resources to the subscriber station in a UL-MAP.

The base station can communicate the pre-allocated codes and associated usage types and semantics in any of a variety of ways. For example, the base station may communicate pre-allocated codes and usage types to a subscriber station using a TLV triplet transmitted on an extended subheader. Similarly, a base station can communicate pre-allocated codes having a usage type and specific semantic using a dedicated message. The base station may use other techniques as well.

The base station can allocate codes for an indefinite period of time or for a defined period of time. The base station can associate a duration with a pre-allocated code based on a characteristic transmitted with the code, based on a usage type, or based on some other factor or combination of factors. An indefinite allocation may remain until it is released by the subscriber station, such as when the subscriber station deregisters with the base station. A temporary allocation can be time or event based. For example, a time based allocation may expire after a predetermined time. An event based allocation may expire upon the occurrence or lack of occurrence of one or more events.

In some instances, the base station may have the ability to allocate codes that remain active so long as the subscriber station continues to use them or otherwise conveys an interest in renewing the allocation. In such a case, the code may remain valid indefinitely.

After pre-allocating one or more random access codes, the base station proceeds to block 480 and is done.

Figure 5:
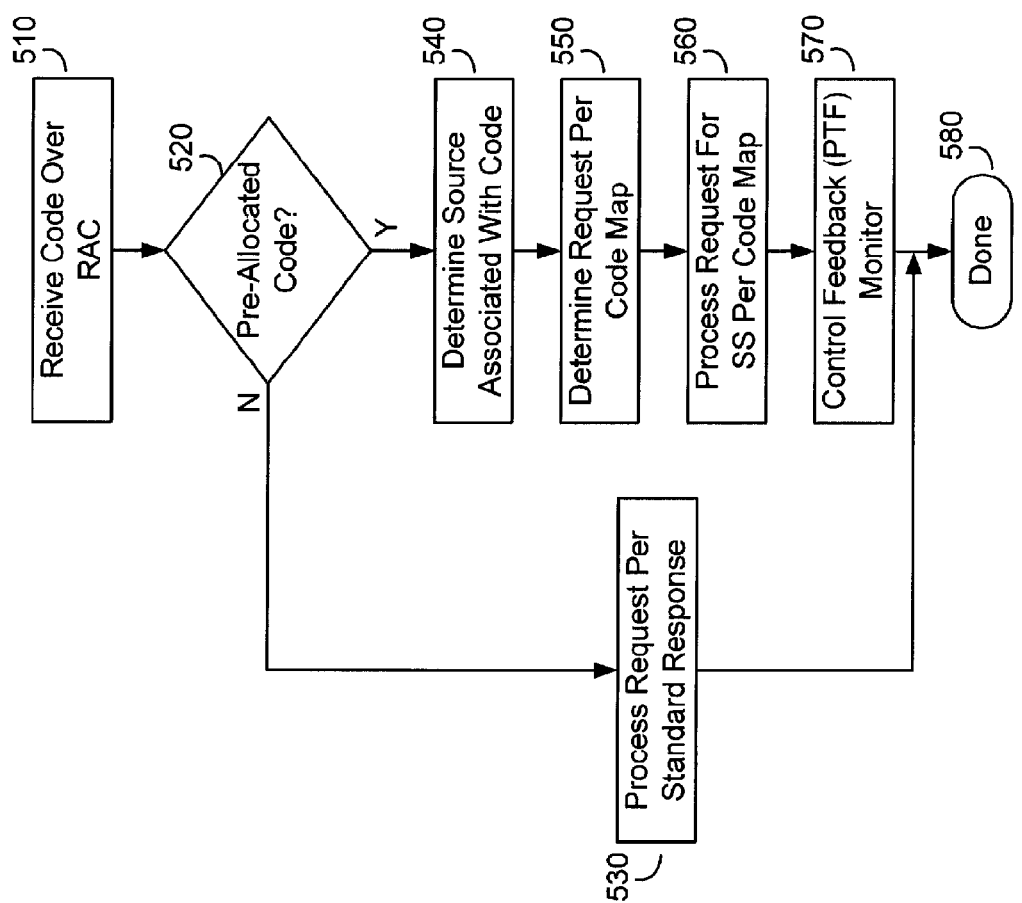
FIG. 5 is a simplified flowchart of an embodiment of processing pre-allocated random access identifiers.

FIG. 5 is a simplified flowchart of an embodiment of a method 500 of processing pre-allocated random access identifiers. The method 500 can be performed, for example, by a base station of the wireless communication system of FIG. 1 or the base station of FIG. 2.

The method 500 begins at block 510 when the base station receives a random access code over the random access channel. For example, the base station can allocate an uplink random access channel having a predetermined number of OFDM subcarriers in a predetermined number of symbols occurring at a predetermined time in an uplink frame. The base station can monitor the random access channel for the presence of a random access code. The base station can determine the presence of a random access code, for example, by correlating the information received over the random access channel with each of the possible random access codes. The base station can perform the method 500 for each random access code identified in the random access channel.

After receiving a code, the base station proceeds to decision block 520 and determines whether the received code corresponds to a pre-allocated code. The base station can, for example, compare the received code to code values in a look up table having the codes and the associated characteristics.

If the base station determines that the code does not correspond to a pre-allocated code, the base station proceeds from decision block 520 to block 530 and processes the code as a request per the standard response techniques. For example, the base station can allocate a small amount of bandwidth to whichever subscriber station transmitted a bandwidth request code so that the subscriber station can identify itself and provide the details of the request. The base station proceeds from block 530 to block 580 and is done.

If the base station, at decision block 520 determines that the received code corresponds to a pre-allocated code, the base station proceeds to block 540 and determines the source associated with the code. In one embodiment, the base station examines a code map to determine the identity of the subscriber station to which the code is allocated. The base station can, for example, store the connection identifier (CID) of the subscriber station with the pre-allocated code in a look up table or a database.

After determining the identity of the subscriber station associated with the code, the base station proceeds to block 550 and determines the request corresponding to the pre-allocated code. In one embodiment, the base station can determine the request by examining a look up table to determine the usage type associated with the pre-allocated code. In another embodiment, the base station can examine a look up table to determine both a usage type and a semantic attached to the pre-allocated code. The semantic can indicate, for example, a particular class of service requested by the subscriber station. In another example, the pre-allocated code can indicate a number of bytes requested in an uplink allocation.

After determining the nature of the request, the base station proceeds to block 560 and processes the request per the code map. The base station can allocate to the subscriber station, for example, the number of bytes requested by the pre-allocated code. In another example, the base station can perform some other action requested by the pre-allocated code.

The base station proceeds to block 570 and performs control loop processing on the received code. The base station can monitor, for example, the power of the received code signal, the timing of the received signal relative to system time, and the frequency of the received signal relative to a desired receive frequency. The base station can generate one or more feedback messages to transmit to the originating subscriber station in order to provide feedback for a closed loop correction performed by the subscriber station. The base station can advantageously monitor the control loop parameters on the received code and can determine a timely feedback message based on the pre-allocated code.

After performing closed loop processing on the received signal, the base station proceeds to block 580 and is done. The base station can repeat the method 500 for each received code.

Figure 6:
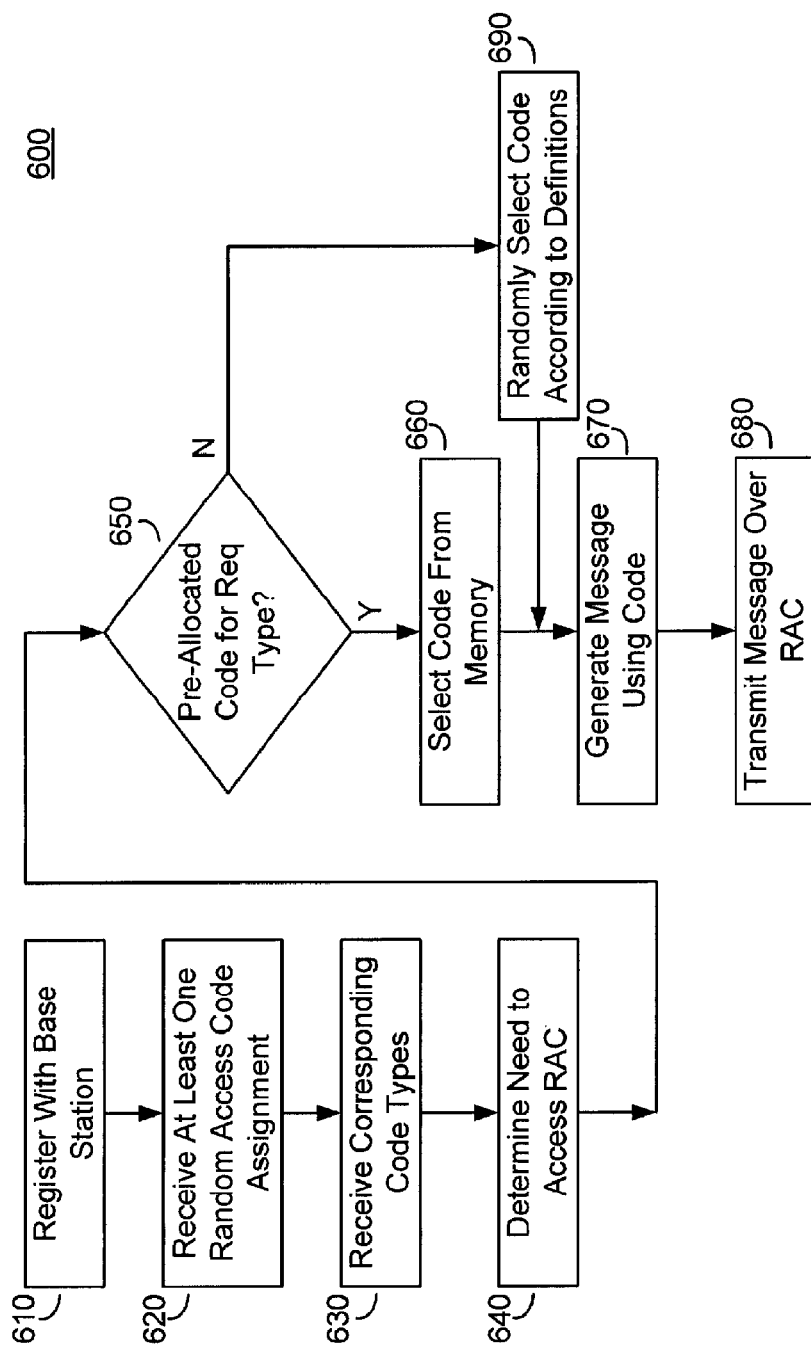
FIG. 6 is a simplified flowchart of an embodiment of implementing pre-allocated random access identifiers.

FIG. 6 is a simplified flowchart of an embodiment of method 600 of implementing pre-allocated random access identifiers. The method 600 can be performed, for example, by a subscriber station of the wireless communication system of FIG. 1 or the subscriber station of FIG. 3.

The method 600 begins at block 610 when the subscriber station registers with a base station. The base station may support pre-allocated codes for registered subscriber stations and may have alternative support for unregistered subscriber stations. Additionally, the subscriber station is typically unable to support an active communication session with the base station unless it is registered with the base station.

During the registration process, the subscriber station determines the set of codes corresponding to the base station or base station sector. The subscriber station also receives from the base station the mapping of the random access codes in the associated code set. For example, the subscriber station can receive a code map that indicates the range of codes associated with initial ranging, periodic ranging, bandwidth requests, and the range of codes reserved for pre-allocation.

The subscriber station selects a code from the set of codes mapped to initial ranging and transmits the code in an instance of the random access channel. The base station receives the initial ranging code during a random access channel ranging opportunity and assigns some resources to the subscriber station that transmitted the initial ranging code during the ranging opportunity to allow the subscriber station to communicate additional information in a dedicated link.

The subscriber station transmits its Medium Access Code (MAC) address to the base station over the assigned resources. The base station responds by assigning a Connection Identifier (CID) to the subscriber station.

The subscriber station uses its CID value to identify itself in communications with the base station. For example, the subscriber station can transmit one or more Subscriber Basic Capability message to the base station that communicates some of the capabilities of the subscriber station. The subscriber station can, for example, communicate the ability to support pre-allocated codes.

The base station can process the Subscriber Basic Capability message and determine the ability of the subscriber station to support pre-allocated codes. The base station can allocate one or more codes to the subscriber station at this point of the registration process.

Additionally, the subscriber station can transmit one or more registration request message to the base station that communicates the capabilities of the subscriber station, including its ability to support pre-allocated codes. The base station can process the registration request message and determine the ability of the subscriber station to support pre-allocated codes. The base station can allocate one or more codes to the subscriber station at this point of the registration process.

The subscriber station proceeds to block 620 and receives at least one pre-allocated code assignment from the base station. Although block 620 is shown as distinct from block 610 illustrating registering with the base station, the subscriber station can receive the one or more pre-allocated code assignment from the base station during the course of registering with the base station. For example, the subscriber station can receive one or more pre-allocated code assignments in response to the Subscriber Basic Capability message. Alternatively, the subscriber station can receive one or more pre-allocated code assignments in response to the registration request message or after the subscriber station registers with the base station. The subscriber station proceeds to block 630 and receives from the base station a usage type corresponding to each pre-allocated code. The subscriber station can also receive a semantic associated with one or more of the pre-allocated codes. The semantic can associate additional information with the pre-allocated access code distinct from the usage type.

After receiving the pre-allocated codes and the associated definitions, the subscriber station proceeds to block 640 and determines that it needs to access the random access channel and transmit a code to the base station. The need to access the random access channel can be any triggering event that results in accessing the random access channel. The subscriber station can determine, for example, that it needs to transmit a periodic ranging code, a bandwidth request, or some other request that can be conveyed over the random access channel.

The subscriber station proceeds to decision block 650 and determines if the subscriber station has a pre-allocated code corresponding to the specific request type. The subscriber station can determine whether any of the pre-allocated codes corresponds to a request that services the triggering event that caused the need to access the random access channel. For example, the subscriber station may have information to transmit on the uplink as the triggering event and need to transmit a bandwidth request. The subscriber station examines the pre-allocated codes to determine if one is associated with bandwidth requests.

If the subscriber station determines that it does not have a corresponding pre-allocated code, the subscriber station proceeds to block 690 and randomly selects a code from the group of codes associated with a desired usage type. The subscriber station then proceeds to block 670, described below.

If the subscriber station determines at decision block 650 that it does have a corresponding pre-allocated code, the subscriber station proceeds to block 660 and selects the desired pre-allocated code from memory, for example from a look up table of pre-allocated codes. The subscriber station proceeds to block 670.

At block 670, the subscriber station generates or otherwise assembles a message using the selected code, regardless of whether the code was selected from a pre-allocated code or randomly selected from a group of codes having the desired usage type. The subscriber station proceeds to block 680 to process the message and transmit the message to the base station over the random access channel.

Applications and Variations

The base station may allocate several codes to a subscriber station, with each code having a different meaning. For example, each distinct pre-allocated code can represent a distinct class of service. In another example, each distinct code can imply a number of pending bytes that the subscriber station has to transmit, operating similar to an incremental bandwidth request. The base station can allocate bandwidth more intelligently since it knows the source of the request and the class of service or number of pending bytes corresponding to each pre-allocated code.

As an example, a subscriber station may have the ability to determine an indication of its level of mobility. A subscriber station can determine its mobility in a variety of ways, such as through examination of a change in its location in time determined using a Global Positioning System (GPS) receiver or some other position location process, such as time of arrival of one reference signals. The subscriber station can report the indication of its mobility to the serving base station.

Alternatively, the base station may have the ability to determine an indication of the mobility of the subscriber station, for example, using time of arrival of a time stamped subscriber station signal or some other means. The base station can determine that a mobile station is highly mobile based on the indication of mobility and can allocate a code to the highly mobile subscriber station. The subscriber station can transmit the allocated code to allow the base station to characterize the power, timing, and frequency of the subscriber station.

In a mobile environment the power, timing, and frequency of the subscriber station needs to be adjusted over time. By allocating a specific code such as a CDMA code to a subscriber station, it is possible for the base station to efficiently estimate the power, timing, and frequency change over time and take appropriate corrective action on both the downlink as well as the uplink. In particular, allocating unique CDMA codes to highly mobile subscriber stations allows for them to transmit in frequent, if not every, ranging opportunity without the worry of colliding. These pre-allocated codes will be decoded at the base station and acted upon with priority in order to provide for quick correction.

The base station can implement a bias or filter mechanism that favor metrics received for a subscriber station. These metrics can be determined from a pre-allocated CDMA code received in the random access channel. Alternatively, the metrics can be determined by the base station from the received information in a scheduled data allocation provided data is being received from mobile station. This information can then be used to potentially calculate timing, power and frequency adjustments more accurately.

A mobile subscriber station can transition from a coverage area supported by a first base station to a coverage area supported by a second base station. In such a scenario, the communication link from the subscriber station is handed over from the first or serving base station to the second base station, referred to as a target base station. In a handover condition, the serving base station or the target base station can allocate a code to the subscriber station for use during the handover.

During a handover condition, the target base station allocates a non-contention initial ranging opportunity using a pre-allocated CDMA code. The target base station assigning a pre-allocated code to a subscriber station for the initial ranging may be advantageous as pre-allocation of an initial ranging code uses fewer resources than allocating an uplink opportunity, especially if the subscriber station in handover does not show up in the target base station for some reason, such as returning to the coverage area of the serving base station.

As another example, a subscriber station can have the ability to establish different types of communication links with a base station. For example, a subscriber station can establish a "best effort" communication link with a base station. The subscriber can establish a communication link with a base station to communicate real time traffic. The link established for real time traffic can be more sensitive to latency compared to the best effort communication link.

The base station can allocate a code to the subscriber station engaged in a link carrying real time traffic. The code can be, for example, used for uplink bandwidth requests and can indicate that the subscriber station is requesting bandwidth in support of real time traffic. The base station receiving the allocated code from the subscriber station will know the identity of the subscriber station and will know that the request is in support of real time traffic. The base station can then prioritize the bandwidth request over a bandwidth request from a subscriber station supporting a best effort link.

Apparatus and methods have been described herein for pre-allocating identifiers, such as CDMA codes, to a subscriber station for use in a random access channel. The base station pre-allocation of codes allows additional information to be conveyed through use of the code and decreases the latency and resources required to service an anonymous resource request over the random access channel.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method for use in a mobile subscriber station, the method comprising:
    receiving an assignment of a single access identifier from a subset of access identifiers of a plurality of access identifiers, the assigned single access identifier is not randomly selected by the mobile subscriber station, the assigned single access identifier useable for random access channel transmission, the subset of access identifiers being access identifiers designated as allocatable access identifiers only useable, for communication with a base station, by the mobile subscriber station subsequent to assignment by the base station;
    receiving a transmission comprising an indication of the subset of access identifiers; and
    transmitting, from the mobile subscriber station to the base station, the assigned single access identifier via the random access channel, the assigned single access identifier uniquely identifying the mobile subscriber station to the base station according to the assignment, the assigned single access identifier avoids a collision probability associated with access identifiers randomly selected by another mobile subscriber station, and the assigned single access identifier avoids a collision probability associated with other access identifiers in the subset of access identifiers transmitted by another mobile subscriber station.

2. The method of claim 1, wherein the assigned single access identifier is used for handover to the base station.

3. The method of claim 1, further comprising:
    adjusting at least one operating parameter of a transmission from the mobile subscriber station to the base station; and
    releasing the assigned single access identifier subsequent to the adjusting.

4. The method of claim 1, further comprising:
    adjusting at least one operating parameter of a transmission from the mobile subscriber station to the base station; and
    transmitting a bandwidth request message to the base station subsequent to the adjusting.

5. The method of claim 1, further comprising:
    receiving, from the base station, a feedback message comprising a timing adjustment.

6. The method of claim 5, further comprising:
    adjusting at least one operating parameter of a transmission from the mobile subscriber station to the base station based at least in part on the feedback message.

7. The method of claim 1, wherein the assignment of the single access identifier from the subset of access identifiers is received by the mobile subscriber station in a dedicated message.

8. The method of claim 1, wherein the assignment of the single access identifier from the subset of access identifiers is received in at least one Orthogonal Frequency Division Multiplex (OFDM) symbol of a plurality of OFDM symbols.

9. The method of claim 1, further comprising:
    receiving, from the base station, a feedback message comprising a timing adjustment;
    adjusting at least one operating parameter of a transmission from the mobile subscriber station to the base station based at least in part on the feedback message;
    transmitting a bandwidth request message to the base station subsequent to the adjusting; and
    releasing the assigned single access identifier subsequent to the adjusting,
    wherein the assignment of the single access identifier from the subset of access identifiers of a plurality of access identifiers is received by the mobile subscriber station in a dedicated message in at least one Orthogonal Frequency Division Multiplex (OFDM) symbol of a plurality of OFDM symbols.

10. The method of claim 1, wherein the assigned single access identifier is used for a specific type of request different from handover.

11. The method of claim 1, wherein the assigned single access identifier is a code division multiple access (CDMA) code.

12. A mobile subscriber station comprising:
    a receiver operable to receive an assignment of a single access identifier from a subset of access identifiers of a plurality of access identifiers, the assigned single access identifier is not randomly selected by the mobile subscriber station, the assigned single access identifier useable for random access channel transmission, the subset of access identifiers being access identifiers designated as allocatable access identifiers only useable, for communication with a base station, by the mobile subscriber station subsequent to assignment by the base station;

the receiver operable to receive a transmission comprising an indication of the subset of access identifiers; and a transmitter operable to transmit, from the mobile subscriber station to the base station, the assigned single access identifier via the random access channel, the assigned single access identifier uniquely identifying the mobile subscriber station to the base station according to the assignment, the assigned single access identifier avoids a collision probability associated with access identifiers randomly selected by another mobile subscriber station, and the assigned single access identifier avoids a collision probability associated with other access identifiers in the subset of access identifiers transmitted by another mobile subscriber station.

13. The mobile subscriber station of claim 12, wherein the assigned single access identifier is used for handover to the base station.

14. The mobile subscriber station of claim 12, further comprising:

a processor operable to adjust at least one operating parameter of a transmission from the mobile subscriber station to the base station, and to release the assigned single access identifier subsequent to the adjustment.

15. The mobile subscriber station of claim 12, further comprising:

a processor operable to adjust at least one operating parameter of a transmission from the mobile subscriber station to the base station, wherein the transmitter is further operable to transmit a bandwidth request message to the base station subsequent to the adjustment.

16. The mobile subscriber station of claim 12, wherein the receiver is further operable to receive, from the base station, a feedback message comprising a timing adjustment.

17. The mobile subscriber station of claim 16, further comprising:

a processor operable to adjust at least one operating parameter of a transmission from the mobile subscriber station to the base station based at least in part on the feedback message.

18. The mobile subscriber station of claim 12, wherein the receiver is operable to receive the assignment of the single access identifier from the subset of access identifiers in a dedicated message.

19. The mobile subscriber station of claim 12, wherein the receiver is operable to receive the assignment of the access identifier from the subset of access identifiers in at least one Orthogonal Frequency Division Multiplex (OFDM) symbol of a plurality of OFDM symbols.

20. The mobile subscriber station of claim 12, wherein the receiver is further operable to receive, from the base station, a feedback message comprising a timing adjustment, further comprising:

a processor operable to adjust at least one operating parameter of a transmission from the mobile subscriber station to the base station based at least in part on the feedback message;

the transmitter further operable to transmit a bandwidth request message to the base station subsequent to the adjustment;

the processor further operable to release the assigned single access identifier subsequent to the adjustment; and the receiver further operable to receive the assignment of the single access identifier from the subset of access identifiers in a dedicated message in at least one Orthogonal Frequency Division Multiplex (OFDM) symbol of a plurality of OFDM symbols.

21. The mobile subscriber station of claim 12, wherein the assigned single access identifier is used for a specific type of request different from handover.

22. The mobile subscriber station of claim 12, wherein the assigned single access identifier is a code division multiple access (CDMA) code.

\* \* \* \* \*